(12) United States Patent
Pan et al.

(10) Patent No.: US 12,631,577 B2
(45) Date of Patent: May 19, 2026

(54) CRYSTAL STRUCTURE DATABASE-BASED MATERIAL ANALYSIS METHOD AND SYSTEM, AND APPLICATION

(71) Applicant: PEKING UNIVERSITY SHENZHEN GRADUATE SCHOOL, Shenzhen (CN)

(72) Inventors: Feng Pan, Shenzhen (CN); Shunning Li, Shenzhen (CN); Cheng Dong, Shenzhen (CN); Wentao Zhang, Shenzhen (CN); Chenxin Hou, Shenzhen (CN); Litao Chen, Shenzhen (CN); Junjie Pan, Shenzhen (CN); Shisheng Zheng, Shenzhen (CN); Yuan Lin, Shenzhen (CN); Hai Lin, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 384 days.

(21) Appl. No.: 18/278,622

(22) PCT Filed: Jul. 30, 2021

(86) PCT No.: PCT/CN2021/109815
§ 371 (c)(1),
(2) Date: Aug. 24, 2023

(87) PCT Pub. No.: WO2022/142328
PCT Pub. Date: Jul. 7, 2022

(65) Prior Publication Data
US 2024/0142394 A1 May 2, 2024

(51) Int. Cl.
G01N 23/2055 (2018.01)

(52) U.S. Cl.
CPC ................................ G01N 23/2055 (2013.01)

(58) Field of Classification Search
CPC ........................... G01N 23/20; G01N 23/2055
See application file for complete search history.

(56) References Cited

U.S. PATENT DOCUMENTS

2006/0100793 A1* 5/2006 Rajeswaran ........... G01N 21/65
702/22
2007/0168130 A1* 7/2007 Sherwood .............. G01N 23/20
702/1
(Continued)

FOREIGN PATENT DOCUMENTS

CN          110176280 A      8/2019
RU            2566399 C1    10/2015
WO      WO-2018025618 A1 *   2/2018   ........... G01N 23/205

OTHER PUBLICATIONS

Translated WO-2018025618 (Year: 2018).*
(Continued)

*Primary Examiner* — David J Makiya
*Assistant Examiner* — Soorena Kefayati

(57) ABSTRACT

Disclosed are a material analysis method based on the crystal structure database, a system, a computer-readable storage medium and an application. The material analysis method includes comparing experimental pattern information obtained from examination of a to-be-tested sample with theoretical pattern information calculated from material structure data in the crystal structure database, and obtaining crystallographic information and phase composition of the to-be-tested sample through intelligent analysis. The crystallographic information include space group, unit cell parameter, and specific coordinates of atoms in unit cell. The crystal structure database has material structure data obtained by experimental measurement and/or theoretical prediction, including chemical formula, space group, unit cell parameter and specific coordinates of atoms in unit cell. Based on this method, large-scale high-throughput and high-
(Continued)

precision material analysis can be achieved, laying the foundation for building a data mining and analysis platform for material patterns.

16 Claims, 9 Drawing Sheets

(56)                    References Cited

U.S. PATENT DOCUMENTS

| | | | |
|---|---|---|---|
| 2008/0275655 A1* | 11/2008 | Moeck | G01N 23/20058 |
| | | | 702/27 |
| 2013/0311136 A1* | 11/2013 | Blonshine | G16C 20/20 |
| | | | 702/180 |
| 2014/0278147 A1* | 9/2014 | Sasaki | G01N 23/207 |
| | | | 702/28 |
| 2015/0355112 A1* | 12/2015 | Sato | G01N 23/20075 |
| | | | 378/62 |
| 2015/0364295 A1* | 12/2015 | Cyrus | H01J 37/28 |
| | | | 250/307 |
| 2016/0005157 A1* | 1/2016 | Toyoda | G06T 7/001 |
| | | | 382/149 |
| 2016/0139065 A1* | 5/2016 | Barak | G01L 1/24 |
| | | | 378/72 |
| 2018/0047975 A1* | 2/2018 | Zhu | H01M 10/0525 |
| 2019/0236333 A1* | 8/2019 | Hsiung | G01N 21/35 |
| 2020/0118117 A1* | 4/2020 | McManus | G06Q 20/06 |
| 2020/0173938 A1* | 6/2020 | Toraya | G01N 23/207 |
| 2021/0018452 A1* | 1/2021 | Toraya | G01N 23/207 |

OTHER PUBLICATIONS

Luca Lutterotti, "Full-profile search-match by the Rietveld method", Jun. 2019, Journal of Applied Crystallography, 52, 587-598 (Year: 2019).*
Mouyi Weng et al., Identify crystal structures by a new paradigm based on graph theory for building materials big data, Science China Chemistry, Aug. 2019, pp. 982-986, vol. 62 No. 8.
He, Yingli, Identification of crystalline phase in a reforming catalyst by powder X-ray diffraction, Analytical Instrumentation, 2015, pp. 23-25, vol. 3.
International Search Report of PCT Patent Application No. PCT/CN2021/109815 issued on Apr. 25, 2022.

* cited by examiner

CRYSTAL STRUCTURE DATABASE-BASED MATERIAL ANALYSIS METHOD AND SYSTEM, AND APPLICATION

TECHNICAL FIELD

The present disclosure relates to material analysis, in particular to a material analysis method, system and application based on crystal structure database.

BACKGROUND OF THE INVENTION

Material structure analysis methods such as X-ray diffraction, neutron diffraction, electron diffraction, infrared spectroscopy, Raman spectroscopy, etc. have been developed based on fundamental principles of interactions between matter and waves to analyze spectroscopic data to obtain information about such as phase composition, lattice parameters and residual strain of samples. In the process thereof, the construction, analysis and retrieval of material databases may be involved.

Diffraction pattern databases opened internationally at present are obtained through experiments, there may be experimental errors and poor distribution regularity of data structure, effecting the speed and accuracy retrieval. There is no experimental error, high data accuracy and a large amount of data for the diffraction pattern database obtained through reverse theoretical calculation based on a crystal structure database, together with direct correlation between diffraction pattern data and crystal structures, which is a new idea for constructing a diffraction pattern database. In addition, the software, including MDI jade, QualX, etc., that completes the key process of obtaining retrieval and matching from the databases, has already been developed, requiring high costs for use and many shortcomings, such as complicated retrieval procedures, stiff functions and unattractive interfaces. It is urgent to develop new material analysis technologies with independent intellectual property rights to solve the shortcomings of existing data composition, analysis methods, and software technology.

SUMMARY OF THE INVENTION

One purpose of the present disclosure is to provide a new material analysis, system and application based on a crystal structure database.

The present disclosure adopts the following technical solutions.

According to an aspect of the present disclosure, disclosed is a material analysis method based on a crystal structure database, comprising: comparing experimental pattern information obtained by examination of a to-be-tested sample with theoretical pattern information obtained by calculation of structure data of various materials from a crystal structure database, and obtaining crystallographic information and relevant phase composition information about the to-be-tested sample by intelligent analysis; wherein the crystallographic information may include at least one of: space group, unit cell parameter, and a specific coordinates of atoms in unit cell; and the crystal structure database may have material structure data obtained by experimental measurement and/or theoretical prediction, the material structure data containing chemical formula, space group, unit cell parameter, and specific coordinates of atoms in unit cell.

It should be noted that the material analysis method according to the present disclosure may obtain theoretical pattern information calculated with known structure data, compare the pattern information of the to-be-tested sample obtained through experiments with the theoretical pattern information, and obtain crystallographic information and relevant phase composition information about the to-be-tested sample according to intelligent analysis of the compared result therefrom. The known structure data is obtained by experimental measurement or theoretical prediction, that is, it is verified known material structure data; and the theoretical pattern information is obtained from the calculation of the known material structure data, a kind of simulated pattern information according to theoretical calculation. With the present disclosure, theoretical pattern information obtained from theoretical calculation is adopted as a pattern database for comparison and the to-be-tested sample is compared and analyzed, which is a new paradigm for material analysis. In this way, defects of the existing material analysis methods, including experimental errors and poor distribution regularity of data structure due to comparison with experimental data of standard products are resolved, and also the problems such as slow retrieval speed and poor accuracy generated therefrom can be resolved. The material analysis method based on the crystal structure database according to the present disclosure, all the pattern information is obtained by the calculation of the known material structure data, which possesses advantages including high accuracy, no experimental errors, good distribution regularity and convenience for retrieval. Moreover, because it is obtained through calculation, all phase characteristics of crystal materials can be extracted accurately, greatly improving the accuracy of material analysis.

In an embodiment of the present disclosure, the intelligent analysis may include:

(1) when the experimental pattern information of the to-be-tested sample matches the theoretical pattern information of the crystal structure database, the crystallographic information and relevant phase composition information about the to-be-tested sample can be obtained directly according the matched result therefrom;

(2) when the experimental pattern information of the to-be-tested sample mismatches the theoretical pattern information of the crystal structure database, 1) retrieving the theoretical pattern information having a same isomorphic structure as that of the experimental pattern information from the crystal structure database, refining the theoretical pattern information of the isomorphic structure so that the refined theoretical pattern information matches the experimental pattern information, and obtaining the crystallographic information and relevant phase composition information about the to-be-tested sample based on a matched result therefrom. In the present disclosure, refining the pattern information or the pattern may refer to adjusting various parameters corresponding to the original pattern, such as replacing known elements of the original pattern, to change the peak size, shape, position, etc. of the pattern curve.

2) when there is no retrieved theoretical pattern information of the isomorphic structure, constructing a structure model cooperatively on the to-be-tested sample by using positive space search, simulated annealing and genetic algorithms in combination of traditional crystallographic methods and machine learning methods, obtaining the theoretical pattern information of the to-be-tested sample by calculation based on the constructed structure model, refining the theoretical pattern information of the to-be-tested sample so that the experimental pattern information obtained by examination of the to-be-tested sample matches the refined theoretical pattern information of the to-be-tested sample, and obtaining the crystallographic information and relevant phase composition information about the to-be-tested sample based on a matched result therefrom. It should be understood that the constructed structure model, the theoretical pattern information of the to-be-tested sample obtained by calculation of the constructed structure model, and the refinement of the theoretical pattern information of the to-be-tested sample are all known information; therefore, if the experimental pattern information matches the refined theoretical pattern information of the to-be-tested sample, the crystallographic information and relevant phase composition information about the to-be-tested sample can be obtained. The corresponding theoretical pattern information of the to-be-tested sample and the obtained crystallographic information and relevant phase composition information about the to-be-tested sample can be added into the crystal structure database to achieve the iterative update of the database.

It should be noted that the matching mentioned in the present disclosure may refer to, for example, calculating representation of structure matching degree value between the experimental pattern information of the to-be-tested sample and the theoretical pattern information of the crystal structure database according to a quality factor matching formula. The larger the matching degree value, the higher the matching degree, and vice versa. When the matching degree value is lower than 0.01, it is considered that the to-be-tested sample has not been matched in the crystal structure database. It can be understood that the specific criteria or thresholds for the matching degree value can be adjusted and set according to needs; and the calculation and thresholds of matching values for different patterns may be various, which are not limited herein.

In an embodiment of the present disclosure, a retrieval mode about the theoretical pattern information of the iso-morphic structure may comprise: retrieving theoretical pattern information of the isomorphic structure from the crystal structure database according to a peak intensity proportional relation contained in the experimental pattern information It can be understood that a crystal structure that is isomorphic to the phase corresponding to the to-be-tested sample shall have a similar proportional relationship between different crystallographic plane indices and peak intensities; therefore, isomorphism may be searched based on the peak intensity proportional relation in the present disclosure. The crystallographic information and related phase information of the to-be-tested sample may be obtained by refinement base on the theoretical pattern information corresponding to the isomorphic structure.

In an embodiment of the present disclosure, the intelligent analysis may further comprise: when the experimental pattern information of the to-be-tested sample mismatches the theoretical pattern information of the crystal structure database, adding the obtained crystallographic information and relevant phase composition information about the to-be-tested sample into the crystal structure database to achieve the iterative update of the crystal structure database.

For example, in an embodiment of the present disclosure, automatic indexing, full spectrum fitting, structure refinement and rapid identification of crystallographic information corresponding to sample pattern for new structures can be achieved in combination with traditional crystallographic methods and machine learning methods; and dynamic iterative update of the database can be realized by updating the crystallographic information of new corresponding structures obtained by rapid refinement to the crystal structure database.

In an embodiment of the present disclosure, both the experimental pattern information and the theoretical pattern information may comprise at least one of: time/space pattern information, and energy pattern information; the time/space pattern information may comprise at least one of X-ray diffraction pattern, neutron diffraction pattern and electron diffraction pattern; and the energy pattern information may comprise at least one of an emission spectrum, an absorption spectrum and a scattered spectrum.

Preferably, the emission spectrum may include the emission spectrum (fluorescence spectrum) of atoms, molecules or materials.

Preferably, the absorption spectrum may include the absorption spectrum of atoms, molecules or materials.

Preferably, the scattered spectrum is Raman spectrum.

In an embodiment of the present disclosure, the calculating procedures of the theoretical pattern information may include but be not limited to:

(1) calculating the time/space pattern information based on a powder diffraction intensity integral formula; and (2) calculating the energy pattern information by simulating crystal structure based on a quantum chemical method, specifically, obtaining optical spectrum information about the emission spectrum, the absorption spectrum and the scattered spectrum by simulating atomic nucleus vibration of crystal structure based on the quantum chemical method, and obtaining energy spectrum information about the emission spectrum, the absorption spectrum and the scattered spectrum by simulating a corresponding electronic structure of crystal structure based on the quantum chemical method.

It should be noted that, in principle, all calculating procedures for theoretical calculation or simulated pattern can be used in the present disclosure, which is not limited here.

In an embodiment of the present disclosure, the material analysis method may further include: when it is difficult to perform accurate structure analysis on one kind of the experimental pattern information of the to-be-tested sample, cooperatively comparing at least two kinds of the experimental pattern information of the to-be-tested sample, and obtaining the crystallographic information and relevant phase composition information about the to-be-tested sample through the intelligent analysis.

Preferably, the intelligent analysis in the material analysis method may further include: quantitative calculation of each content percentage of each phase of the to-be-tested sample according to phase composition information of the to-be-tested sample.

It should be noted that the key of the present disclosure is to compare the experimental pattern information with the theoretical pattern information, so as to obtain the crystallographic information and relevant phase composition information about the to-be-tested sample. The pattern information can be determined according to specific experimental situations. For example, if the X-ray diffraction pattern of the to-be-tested sample is measured, it shall be compared with the X-ray diffraction pattern calculated from the corresponding crystal structure database; and if the X-ray diffraction pattern and atomic emission spectrum of the to-be-tested sample are measured at the same time, they shall be compared with the X-ray diffraction pattern and atomic emission spectrum calculated from the corresponding crystal structure database. It shall be understood that, in principle, the more experimental pattern information of the to-be-tested sample is obtained from experiments, the more comparisons are made in the crystal structure database, and accordingly the results therefrom will be more accurate. Therefore, in an embodiment of the present disclosure, it is preferred to use at least two kinds of experimental pattern information for comparison.

It should also be noted that with the material analysis method according to the present disclosure, the crystallographic information and relevant phase composition information about the to-be-tested sample can be obtained, further each phase composition can be quantitatively calculated as required. For example, taking $Al_2O_3$ as an example, for a case where the sample contains multiple structural phases, RIR values corresponding to standard $Al_2O_3$ can be calculated theoretically, and the content percentage of a structure in the crystal structure database that matches the pattern characteristic peak of the sample can be quantitative calculated, achieving quantitative analysis of the content of each phase in the sample.

In an embodiment of the present disclosure, the material structure data obtained by experimental measurement in the crystal structure database may refer to the material structure data obtained by experimental characterization of samples with known structures; and the material structure data obtained by theoretical prediction may be the one which is calculated by at least one of the calculating procedures and then obtained after eliminating repeated structures in the structure database with a graph theory based scheme.

The calculating procedures may comprise:

procedure 1): performing element substitution on the material structure data obtained by experimental characterization of samples with known structures before performing structure relaxation in combination with density functional theory (DFT) to obtain a new material and the material structure data thereof;

procedure 2): performing structure search on the material structure data obtained by experimental characterization of samples with known structures based on particle swarm optimization (PSO) and/or genetic algorithm to obtain new material and the material structure data thereof; or procedure 3): performing feature extraction on the material structure data obtained by experimental characterization of samples with known structures, and obtaining a new material and the material structure data thereof by reverse design based on the extracted features.

It should be noted that the graph theory based scheme in the present disclosure is the method described in a previous patent application No. 201910390012.2 titled "A Method For Describing the Crystal Structure of Materials"; and the material structure data can be obtained by construction based on the graph theory scheme. It can be understood that this new crystal structure description based on the graph theory scheme can be easily implemented by computer language, so as to achieve de duplication of isomorphic structures. Therefore, all the technical information related to the crystal structure description of the material in the patent application No. 201910390012.2 is cited in the present disclosure to illustrate and explain the crystal structure database and the preparation method thereof.

In an embodiment of the present disclosure, regarding the intelligent analysis of the X-ray diffraction pattern (XRD diffraction pattern), according to the matching degree of the diffraction peak positions and peak intensities corresponding to the experimental pattern information about the X-ray diffraction pattern of the to-be-tested sample and the theoretical pattern information about the X-ray diffraction pattern calculated from the crystal structure database, the matching degree of corresponding structures between the experimental pattern of the to-be-tested sample and the theoretical pattern of the crystal structure database can be determined. Specifically, the matching degree of structures between the experimental and theoretical patterns is calculated through the quality factor matching formula. The larger the matching degree value, the higher the matching degree, and vice versa. When the matching degree value is higher than a certain value, such as greater than or equal to 0.01, it is considered that the structure in the corresponding crystal structure database belongs to a phase in the to-be-tested sample. When the matching degree value is lower than a certain value, such as less than 0.01, it is considered that the to-be-tested sample has not been matched in the crystal structure database, and a further isomorphic judgment is needed. If there is isomorphic matching, analysis is performed according to the isomorphic matching; and if there is no isomorphic matching, analysis is further performed in combination with traditional crystallographic methods, machine learning methods and existing structures in the crystal database.

Specifically, the material analysis method based on the X-ray diffraction pattern may include the following steps:

comparing the experimental pattern information about the X-ray diffraction pattern obtained by the examination of the to-be-tested sample with the theoretical pattern information about the X-ray diffraction pattern calculated from the structure data of each material in the crystal structure database, when they match, the crystallographic information and relevant phase composition information about the to-be-tested sample may be obtained directly according to the matched result therefrom; and when they mismatch, the following operations may be performed:

1) Diffraction Pattern Indexing

The indexing method for X-ray diffraction pattern of polycrystalline powders is to find solution(s) that meet the following equations within an experimental error range, calculate the lattice parameters, including a, b, c and alpha, beta and gamma, from the crystallographic plane spacing corresponding to the diffraction peaks, and determine the crystallographic plane indices of the diffraction peaks.

2) Space Group Determination

According to the systematic extinction caused by the presence of centered lattice, spiral axis and slip plane in the crystal, the lattice type and X-ray diffraction group of the crystal may be determined after indexing; and the space group may be determined based on the statistical law of diffraction intensity.

3) Construction of Structure Model

With the support of a large amount of structure data in the crystal structure database, searching for isomorphic structures may be performed first. Regarding a new compound crystal structure, since a large number of crystal structures have been studied and entered the database, checking whether it is isomorphic to a certain compound with a known structure first. After the chemical formula, lattice parameters and space group of the new compound are determined, substances with similar chemical formula, lattice parameters and space group can be searched in the structure database according to the number of atoms in the cell and the chemical properties of the elements, and the diffraction patterns of the two may be compared. A comparison method may be to search the isomorphic structure in the crystal structure database according to the peak intensities contained in the pattern information and the crystallographic plane index information of the corresponding peak intensities obtained through indexing. The crystal structure which is isomorphic to a corresponding substance of the experimental sample shall have a similar proportional relationship between different crystallographic plane indices and peak intensities. If a compound with a similar diffraction pattern and a known crystal structure can be found, that is, the theoretical pattern information of the isomorphic structure, the distribution and rough position of atoms in the new compound can be determined. Then they may be performed with Rietveld refinement such that the refined theoretical pattern information matches the experimental pattern information, and then the crystallographic information and relevant phase composition information about the to-be-tested sample can be obtained based on the matched result therefrom.

Regarding the to-be-tested sample that do not have isomorphic structures retrieved in the crystal structure database, combined with the traditional crystallographic methods and the machine learning methods, a structure model may be constructed cooperatively by using positive space search, simulated annealing and genetic algorithms, a new theoretical pattern information obtained by calculation based on the constructed structure model may be refined so that the refined theoretical pattern information matches the experimental pattern information, and then the crystallographic information and relevant phase composition information about the to-be-tested sample may be obtained based on the matched result therefrom.

In an embodiment of the present disclosure, the refinement of pattern information or pattern may be specifically Rietveld refinement, that is, Rietveld structure refinement, which may include using fitting methods such as least square method and adjusting various parameters to change the peak value, shape, position, etc. of the curve of the theoretical pattern of XRD diffraction pattern calculated based on the crystal structure database, so that the theoretical curve is consistent with the experimental pattern curve of the X-ray diffraction pattern of the to-be-tested sample, that is, matching, thereby obtaining the required experimental results, such as specific atomic position, bond length, bond angle information, more accurate lattice constant, and the like. The crystal structures obtained after refinement and without being included in the database may be stored in the crystal structure database to upgrade the crystal structure database.

It can be understood that the crystal structure database is an open database, which can be continuously updated according to the actual examination, and more newly developed new materials can be added to it to meet the use needs of new material analysis.

In an embodiment of the present disclosure, the theoretical pattern information about the X-ray diffraction pattern may be obtained from the XRD diffraction intensity integral formula of the powder sample based on the known crystal structures, wherein the powder diffraction intensity integral formula is shown as the following Equation 1.

$$I_{(hkl)\alpha} = \left[ \frac{I_0\lambda^3}{32\pi r} \frac{e^4}{m_e^2 c^4} \right] \times \left[ \frac{M_{hkl}}{2V_\alpha^2} |F_{(hkl)\alpha}|^2 \right]$$  Equation 1

8

-continued $$\left( \frac{1 + \cos^2 2\theta \cos^2 2\theta_m}{\sin^2\theta\cos\theta} \right) \exp\left(-2B\left(\sin\theta/\lambda\right)^2\right) \right] \times \left[ \frac{W_\alpha}{\rho_\alpha\mu_m^*} \right]$$

where $I_0$ represents the intensity of an incident beam, $\lambda$ represents a wavelength, e represents the charge of an electron, $m_e$ represents the mass of the electron, r represents the distance from a scattered electron to the detector, c represents the speed of light, $M_{hkl}$ and $F_{hkl}$ respectively represents the multiplicity and structure factor of hkl reflection, $V_\alpha$ represents the cell volume of $\alpha$ phase, $\theta$ and $\theta_m$ respectively represents the diffraction angles of hkl reflection and monochromator, B represents an average atomic displacement parameter (ADP), $W_\alpha$ and $\rho_\alpha$ respectively represents the weight fraction and density of $\alpha$ phase, and $\mu_m^*$ represents the mass absorption coefficient of the whole sample.

In an embodiment of the present disclosure, quantitative calculation of the content percentage of each phase in the to-be-tested sample may specifically include performing quantitative calculation on the data of each diffraction peak in a to-be-measured phase; that is, the RIR value of each diffraction peak of the to-be-measured phase is calculated according to the diffraction intensity at the corresponding position in the corundum diffraction pattern, and the mass fraction of the to-be-measured phase is obtained by combining the intensity proportion of different diffraction peaks in the diffraction pattern of the whole to-be-measured phase. The details are as follows:

For phase x in X mixed phases, its mass fraction may be $$W_x = \frac{\sum_{m=1}^{M} \varphi_m \frac{I_m}{RIR_m}}{\sum_{x=1}^{X} \sum_{m=1}^{M} \varphi_m \frac{I_m}{RIR_m}}$$

where $$\varphi_m = \frac{I_m}{\sum_{m=1}^{M} I_m}$$

$$RIR_m = \frac{I_m}{I_m^{\alpha-Al_2O_3}}$$

where M represents the number of diffraction peaks of phase x, m represents the m-th diffraction peak arranged in descending order of intensity in the phase x diffraction pattern, $I_m$ represents the diffraction intensity of the m-th diffraction peak, $$I_m^{\alpha-Al_2O_3}$$

represents the m-th diffraction peak arranged in descending order of intensity in the standard corundum diffraction pattern.

In an embodiment of the present disclosure, the material analysis method may further include: performing pattern pre-processing on the experimental pattern information obtained by examination of the to-be-tested sample before comparing with the theoretical pattern information of the crystal structure database, wherein the pattern pre-processing comprising performing processes on the obtained experimental pattern information of the to-be-tested sample include eliminating noise, subtracting background and smoothing curves.

It should be noted that the purpose of the pattern pre-processing is to remove the noise signals or background signals in the experimental pattern information of the to-be-tested sample, or curve smoothing is used to facilitate subsequent comparison, improving the speed and accuracy of comparative analysis.

In an embodiment of the present disclosure, the material analysis method may further include: performing peak search before comparing with the theoretical pattern information of the crystal structure database, the peak search comprising finding characteristic peak information of the experimental pattern information of the to-be-tested sample; and setting a peak intensity recognition threshold and a peak spacing recognition threshold according to the characteristic peak information about the experimental pattern of the to-be-tested sample during comparison to determine the comparison range, so as to improve the peak searching accuracy of the pattern.

It should be noted that the peak searching aims to roughly determine the comparison range through preset parameters so as to improve the efficiency and accuracy of the comparison. The data about peak positions and peak intensities input during retrieval is determined by the results of peak searching, so the setting of peak searching accuracy will affect final retrieval accuracy: selecting too dense, small peaks and too sparse peaks will lead to dilution or loss of key information of samples, leading to inaccurate retrieval results.

A material analysis system based on a crystal structure database disclosed in accordance with another aspect of the present disclosure may include a crystal structure database, a theoretical pattern information calculating unit, a data pre-processing unit, a comparing unit and a result outputting unit. The crystal structure database may have material structure data obtained by experimental measurement and/or theoretical prediction. The material structure data may contain chemical formula, space group, unit cell parameter, and specific coordinates of atoms in unit cell. The theoretical pattern information calculating unit may be configured to calculate theoretical pattern information according to structure data of each material in the crystal structure database. The data pre-processing unit may be configured to obtain the experimental pattern information obtained by examination of the to-be-tested sample and perform de-noising processing on the experimental pattern information. The comparing unit may be configured to compare the result of the data pre-processing unit with the theoretical pattern information calculated by the theoretical pattern information calculating unit. The result outputting unit may be configured to output the crystallographic information and relevant phase composition information about the to-be-tested sample by intelligent analysis according to the result of the comparing unit, wherein the crystallographic information may include at least one of space group, unit cell parameter, and specific coordinates of atoms in unit cell.

It should be noted that in the material analysis system based on a crystal structure database according to the present disclosure, the theoretical pattern information calculating unit is mainly used to calculate the theoretical pattern information according to the structural data of each material in the crystal structure database. The specific type of theoretical pattern to be calculated can be determined according to the experimental pattern information obtained by examination of the to-be-tested sample, which is not limited here. It shall be understood that various types of theoretical pattern information may also be calculated in advance, stored in the database, and directly called during use, thereby saving the calculation steps of the theoretical pattern information, improving system efficiency. However, this requires a large amount of storage space. Therefore, it is possible to design the theoretical pattern information calculating unit as required, or pre-store calculated theoretical pattern information. The noise removal performed on the experimental pattern information in the data pre-processing unit of the material analysis system is actually the pattern pre-processing on the experimental pattern information obtained by examination of the to-be-tested sample. Specifically, it may include performing processes on the experimental pattern information of the to-be-tested sample for subsequent comparison, such as eliminating noise, subtracting background and smoothing curves, improving the speed and accuracy of the comparative analysis. Furthermore, the data pre-processing unit may further include, for example, recognizing the characteristic peak information from the experimental pattern information, so that the peak intensity recognition threshold and the peak spacing recognition threshold can be facilitately set according to the characteristic peak information about the experimental pattern of the to-be-tested sample during comparison, so as to determine the comparison range and improve the peak searching accuracy of the pattern.

It should also be noted that the material analysis system based on a crystal structure database is actually used to perform each unit of the material analysis method based on the crystal structure database through each unit to achieve automatic material analysis. Therefore, the functions and roles of each unit of the material analysis system can refer to the material analysis method. For example, the intelligent analysis adopted in the result outputting unit can refer to the material analysis method, that is, when the experimental pattern information matches the theoretical pattern information, the crystallographic information and relevant phase composition information about the to-be-tested sample can be obtained directly based on the matched result therefrom; and when they mismatch, isomorphic structures may be searched. When there are isomorphic structures, refinement may be performed based on the theoretical pattern information of the isomorphic structure to obtain the crystallographic information and relevant phase composition information about the to-be-tested sample; and when there is no isomorphic structure, the structure model may be constructed cooperatively for the to-be-tested sample by using positive space search, simulated annealing and genetic algorithms in combination of the traditional crystallographic methods and the machine learning methods. The theoretical pattern information of the to-be-tested sample may then be calculated from the constructed structure model for refinement, so that the experimental pattern information obtained by examination of the to-be-tested sample matches the refined theoretical pattern information of the to-be-tested sample, and the crystallographic information and relevant phase composition information about the to-be-tested sample can be obtained based on the matched result therefrom. For another example, the retrieval mode for isomorphic structures, the iterative update of the crystal structure database, the type of pattern information, the calculating procedures of the theoretical pattern information, the quantitative calculation of content percentage of each phase in the to-be-tested sample, the method of obtaining the material structure data from the crystal structure database with experimental measurement, and the method of obtaining the material structure data from the crystal structure database with theoretical prediction, etc. can all refer to the material analysis method. The type of pattern information may be such as the time/space pattern information, and the energy pattern information.

In an embodiment of the present disclosure, the data pre-processing unit may further include identifying contents of files in different formats for the experimental pattern information of the to-be-tested sample, and read relevant information in the files for subsequent comparison according to a result of file identification.

In an embodiment of the present disclosure, the material analysis system may further include a crystal structure database searching unit configured to extract and present the crystal structure database as a whole. This unit may provide a user with a way to directly access the database information. All data of the corresponding structure in the crystal structure database, including chemical formula, space group, unit cell parameters and specific coordinates of atoms in unit cell, can be found through any of ICSD number, chemical formula, and constituent elements. In the present disclosure, the unit cell parameters mainly include lattice vector and unit cell volume.

In an embodiment of the present disclosure, the material analysis system may further include a pattern calculating unit. The pattern calculating unit may be configured to calculate a pattern of a given structure and perform broadening calculation on a pattern containing only peak positions and peak intensities. This unit can provide an intuitive visual effect of the peak shape, allowing users to more easily compare with their own experimental data.

Preferably, the broadening calculation may include broadening intensity values with Gaussian, Lorentz, Voigt and convolution, and accumulating an overlapping part of the four kinds of broadened. Different experimental diffraction conditions and sample conditions may produce different peak shapes. This step allows users to fine adjust the standard peak shapes according to their own experimental pattern to obtain a best contrast mode.

In an embodiment of the present disclosure, the material analysis system may further include a single peak search unit. The single peak search unit may include select a peak with a mouse, or manually, or input a specific peak position, peak intensity and precision data to search and present the crystal structure database. In this step, users can search for a specific peak to obtain all the structure information of the peak in the database.

It can be understood that all or part of the functions of the material analysis method based on the crystal structure database according to the present disclosure can be achieved by hardware or a computer program. When implemented by the computer program, the program can be stored in a computer-readable storage medium, which can include read-only memory, random access memory, magnetic disk, optical disk, hard disk, etc.; and the program is executed by a computer to realize the material analysis method. For example, the program may be stored in the memory of the device and then be executed by the processor, in this way, the method disclosed herein can be realized. When all or part of the functions in the method disclosed herein are realized by computer program, the program can also be stored in a server, another computer, disk, optical disk, flash disk or mobile hard disk and other storage media, and then be saved to the memory of a local device by downloading or copying; or the version of the system of the local device is updated, and then when the processor executes the program in the memory, all or part of the functions of the material analysis method based on the crystal structure database disclosed here in can be realized.

Accordingly, a material analysis system based on a crystal structure database disclosed in accordance with yet another aspect of the present disclosure may include a memory and a processor; the memory may be configured to store a program; and the processor may be configured to implement the material analysis method by executing the program stored in the memory.

According to still another aspect of the present disclosure, disclosed is a computer-readable storage medium, comprising a program store therein, the program being capable of being executed by a processor to implement the material analysis method.

According to yet still another aspect of the present disclosure, disclosed is an application that utilizes the material analysis method, the material analysis system, or the computer-readable storage medium in the development of new materials, analysis of unknown material structures, or analysis of unknown material components.

It can be understood that the material analysis method and system according to the present disclosure can analyze unknown materials, obtain their crystallographic information and relevant phase composition information, and even conduct quantitative analysis on the phase composition of unknown materials; accordingly, it can be used for new material research and development, unknown material structure analysis or unknown material composition analysis.

The beneficial effects of present disclosure are:

With the material analysis method according to the present disclosure, i.e. by means of obtaining the theoretical pattern information calculated from the material structure data such as specific atomic positions and unit cell configuration provided by the structure data in the crystal structure database, comparing the experimental pattern information of the to-be-tested sample with the theoretical pattern information, and obtaining the crystallographic information and relevant phase composition information about the to-be-tested sample through intelligent analysis, material analysis driven by big data of material gene can be realized, which is a new paradigm of material analysis method. With comparison with theoretical pattern information obtained by calculation, the material analysis method can achieve large-scale, high-throughput and high-precision material analysis, which lays a foundation for building a materials pattern data mining and analysis platform.

BRIEF DESCRIPTION OF THE DRAWINGS

FIG. 7 is a schematic diagram showing all information searched in the database in accordance with an embodiment of the present disclosure;

FIG. 9 is a schematic diagram of a single peak search mode in accordance with an embodiment of the present disclosure.

DETAILED DESCRIPTION

Figure 1:
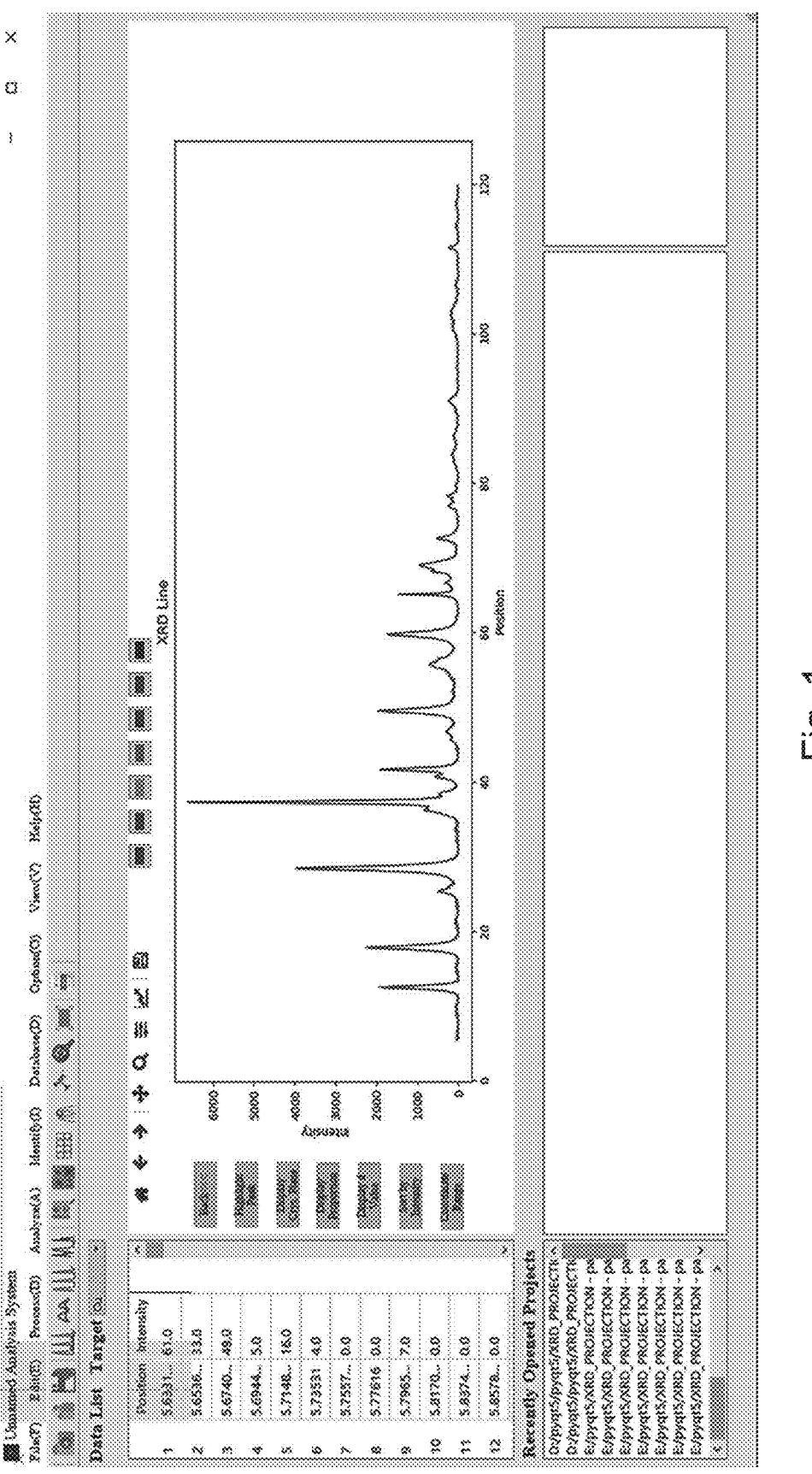
FIG. 1 is a schematic interface diagram after importing file in accordance with an embodiment of the present disclosure.

The existing material analysis methods are generally based on actual test results of standard samples or other known materials to compare and analyze new materials. Such data analysis paradigm has been researched and applied. However, it may have some shortcomings such as experimental errors, poor distribution regularity of data structure, slow retrieval speed, and poor accuracy. In addition, high usage fees, complicated retrieval procedures, stiff functions, and unattractive have also been criticized by the industry.

Professor Pan Feng, one of the inventors of the present disclosure, and his team have developed a new paradigm of structure chemistry and materials genome based on graph theory, in which a nearest neighbor atom bonded to a central atom is defined as a structural unit, then the atom or structural unit is abstracted into a point in graph theory, achieving, in combination with computer intelligent computing, a technical breakthrough in correctly determining structural isomorphism and quantitatively describing the degree of isomerization and evolution between structures. With the expression methods of crystal structure and material gene based on graph theory proposed by Professor Pan Feng and his team, the space atomic/molecular structure can be geometrically topologized, greatly improving the efficiency and accuracy of intelligent material identification, and constructing a high-quality crystal structure database with over 600,000 structures. The graph theory and material crystal structure expression method can refer to patent application No. 201910390012.2. The crystal structure description of material structure data in the crystal structure database of the present disclosure refers to the patent application, and all relevant contents in the patent application are cited to the present disclosure.

Based on the above research, a new material analysis method and system are proposed creatively which uses graph theory scheme to achieve high-quality classification and cleaning of the database, obtain standard theoretical pattern information through reverse calculation, and achieves intelligent detection and analysis of the materials to be tested in combination with computer high-throughput intelligent comparison and intelligent analysis. The first generation system developed by Professor Pan Feng and his team has been put into application to provide services for a large number of scientific researchers.

Specifically, the material analysis method based on the crystal structure database according to the present disclosure may include comparing the experimental pattern information obtained by examination of the to-be-tested sample with the theoretical pattern information calculated from the structure data of each material in the crystal structure database, and obtaining the crystallographic information and relevant phase composition information about the to-be-tested sample through intelligent analysis. The crystallographic information may include at least one of space group, unit cell parameter, and specific coordinates of atoms in unit cell. The crystal structure database may have material structure data obtained by experimental measurement and/or theoretical prediction. The material structure data may include chemical formula, space group, unit cell parameter, and specific coordinates of atoms in unit cell.

The intelligent analysis can be divided into three situations as follows.

When the experimental pattern information of the to-be-tested sample matches the theoretical pattern information, the crystallographic information and relevant phase composition information about the to-be-tested sample may be obtained directly based on the matched result therefrom. It shall be understood that if the experimental pattern information matches the theoretical pattern information, it may mean that the to-be-tested sample is identical to the material in the crystal structure database corresponding to the theoretical pattern information, so that the crystallographic information and relevant phase composition information about the to-be-tested sample may be outputted directly, including chemical formula, space group, unit cell parameter, and specific coordinates of atoms in unit cell.

When the experimental pattern information of the to-be-tested sample mismatches the theoretical pattern information, and the theoretical pattern information having structure isomorphic to that of the experimental pattern information is retrieved, the theoretical pattern information of the isomorphic structure may be performed with refinement such that the refined theoretical pattern information matches the experimental pattern information, and then the crystallographic information and relevant phase composition information about the to-be-tested sample can be obtained based on the matched result therefrom. In this case, the it is actually using isomorphic methods to analyze the to-be-tested sample. The way to determine isomorphism and solve isomorphism can refer to the prior art. However, in an embodiment of the present disclosure, the theoretical pattern information of the isomorphic structure may be retrieved in the crystal structure database according to the peak intensity proportional relation contained in the experimental pattern information; and the theoretical pattern information of the isomorphic structure may be performed with refinement, such that the refined theoretical pattern information matches the experimental pattern information.

When the experimental pattern information of the to-be-tested sample mismatches the theoretical pattern information, and the theoretical pattern information having structure isomorphic to that of the experimental pattern information is not retrieved, i.e., there is no isomorphism, the structure model can be constructed cooperatively for the to-be-tested sample by using positive space search, simulated annealing and genetic algorithms in combination with the traditional crystallographic methods and the machine learning methods. The theoretical pattern information of the to-be-tested sample can be calculated from the constructed structure model, then be refined such that the experimental pattern information obtained by examination of the to-be-tested sample matches the refined theoretical pattern information of the to-be-tested sample, and the crystallographic information and relevant phase composition information about the to-be-tested sample can be obtained based on the matched result therefrom.

In a further improvement scheme of the present disclosure, when the experimental pattern information mismatches the theoretical pattern information, the obtained crystallographic information and relevant phase composition information about the to-be-tested sample may also be added into the crystal structure database to achieve the iterative update of the crystal structure database.

There are two ways to obtain the material structure data of the crystal structure database in the present disclosure. One is by experimental measurement, that is, the material structure data obtained by experimental characterization of samples with known structures. The other is the material structure data obtained by theoretical prediction.

The material structure data obtained by theoretical prediction may be the one which is calculated by at least one of the following calculating procedures and then obtained after eliminating repeated structures in the structure database with a graph theory based scheme:

procedure 1): performing element substitution on the material structure data obtained by experimental characterization of samples with known structures before performing structure relaxation in combination with DFT to obtain a new material and the material structure data thereof;

procedure 2): performing structure search on the material structure data obtained by experimental characterization of samples with known structures based on PSO and/or genetic algorithm to obtain new material and the material structure data thereof; and procedure 3): performing feature extraction on the material structure data obtained by experimental characterization of samples with known structures, and obtaining a new material and the material structure data thereof by reverse design based on the extracted features.

In the present disclosure, the type of the pattern information (namely the experimental pattern information and the theoretical pattern information) may include time/space pattern information and energy pattern information. The time/space pattern information may be such as X-ray diffraction pattern, neutron diffraction pattern, and electron diffraction pattern. The energy pattern information may include emission spectrum, absorption spectrum, and scattered spectrum. The emission spectrum may be such as atomic emission spectrum and/or infrared emission spectrum; the absorption spectrum may be such as infrared absorption spectrum and/or ultraviolet absorption spectrum; and the scattered spectrum may be such as Raman spectrum.

The calculating procedures of the theoretical pattern information from the material structure data in the present disclosure may include:

(1) calculating the time/space pattern information based on a powder diffraction intensity integral formula; and (2) calculating the energy pattern information by simulating crystal structure based on a quantum chemical method, specifically, obtaining optical spectrum information about the emission spectrum, the absorption spectrum and the scattered spectrum by simulating atomic nucleus vibration of crystal structure based on the quantum chemical method, and obtaining energy spectrum information about the emission spectrum, the absorption spectrum and the scattered spectrum by simulating a corresponding electronic structure of crystal structure based on the quantum chemical method.

It can be understood that, to improve the accuracy of material analysis of the to-be-tested sample, at least two kinds of experimental pattern information of the to-be-tested sample can be compared to obtain the crystallographic information and relevant phase composition information about the to-be-tested sample.

In addition, the material analysis method of the present disclosure may also include: quantitatively calculation of each content percentage of each phase of the to-be-tested sample according to phase composition information of the to-be-tested sample.

Based on the material analysis method of the present disclosure, a material analysis system based on a crystal structure database may further be proposed. The system may include a crystal structure database, a theoretical pattern information calculating unit, a data pre-processing unit, a comparing unit and a result outputting unit. The crystal structure database may have material structure data obtained by experimental measurement and/or theoretical prediction, and the material structure data may contain chemical formula, space group, unit cell parameter, and specific coordinates of atoms in unit cell coordinate of atoms in unit cell. The theoretical pattern information calculating unit may be configured to calculate theoretical pattern information according to structure data of each material in the crystal structure database. The data pre-processing unit may be configured to obtain the experimental pattern information obtained by examination of the to-be-tested sample, and perform noise removal on the experimental pattern information. The comparing unit may be configured to compare the result of the data pre-processing unit with the theoretical pattern information calculated by the theoretical pattern information calculating unit. The result outputting unit may be configured to output the crystallographic information and relevant phase composition information about the to-be-tested sample through intelligent analysis based on the result of the comparing unit, wherein the crystallographic information may include at least one of space group, unit cell parameter, and specific coordinates of atoms in unit cell.

A material analysis system based on a crystal structure database may also be provided according to the present disclosure. The system may include a memory and a processor, wherein the processor may be configured to implement the following steps by executing the program stored in the memory: comparing the experimental pattern information obtained by examination of the to-be-tested sample with the theoretical pattern information calculated from the structure data of each material in the crystal structure database, and obtaining the crystallographic information and relevant phase composition information about the to-be-tested sample through intelligent analysis. The crystallographic information may include at least one of space group, unit cell parameter, and specific coordinates of atoms in unit cell. The crystal structure database may have material structure data obtained by experimental measurement and/or theoretical prediction; and the material structure data may contain chemical formula, space group, unit cell parameter and specific coordinates of atoms in unit cell.

A computer-readable storage medium including a program stored therein may also be provided according to the present disclosure. The program can be executed by a processor to realize the following steps: comparing the experimental pattern information obtained by examination of the to-be-tested sample with the theoretical pattern information calculated from the structure data of each material in the crystal structure database, and obtaining the crystallographic information and relevant phase composition information about the to-be-tested sample through intelligent analysis. The crystallographic information may include at least one of space group, unit cell parameter, and specific coordinates of atoms in unit cell; the crystal structure database may have material structure data obtained by experimental measurement and/or theoretical prediction; and the material structure data may contain chemical formula, space group, unit cell parameter, and specific coordinates of atoms in unit cell.

With the material analysis method and system according to the present disclosure, the problems of cumbersome use and high cost of the existing material analysis systems can be solved, breaking the original data paradigm and technological monopolies, creating a new prospect for material analysis, and resolving the shortcomings in the existing data composition, analysis methods, software technology and so on. Moreover, the theoretical pattern information used in the material analysis method of the present disclosure is obtained by calculating the material structure data in the crystal structure database, avoiding problems such as experimental errors and poor distribution regularity of data structure caused by experiments in the existing crystallographic database.

In addition, the material analysis system according to the present disclosure is clean, beautiful and convenient to use. It is a new type of "unnamed material analysis system" with independent intellectual property rights. Even various interfaces and presentation manners of the material analysis system according to the present disclosure, including icons, login interface, interface after importing files, element retrieval interface, interface presentation after retrieval, report diagram, comparison of recently opened projects, database search mode, resulting in advantages including simple retrieval program, easy to use, beautiful, neat and generous interface, fast retrieval, and more user-friendly functions.

In summary, the material analysis system of according to the present disclosure comprehensively considers various factors such as the current research and development situation at home and abroad, the positioning and strength of schools and colleges, and the needs of researchers, especially suitable for the structure analysis system used by scientific researchers.

The present disclosure will be further illustrated in detail below through specific embodiments and accompanying drawings. The following embodiments are only for further explanation of the present disclosure and should not be construed as a limitation of the present disclosure.

EMBODIMENTS

The material analysis method based on the crystal structure database in an embodiment may include: comparing the experimental pattern information obtained by examination of the to-be-tested sample with the theoretical pattern information calculated from the structure data of each material in the crystal structure database, and obtaining the crystallographic information and relevant phase composition information about the to-be-tested sample through intelligent analysis. The crystallographic information may include at least one of space group, unit cell parameter, and specific coordinates of atoms in unit cell. The crystal structure database may have material structure data obtained by experimental measurement and/or theoretical prediction. The material structure data may contain chemical formula, space group, unit cell parameter, and specific coordinates of atoms in unit cell.

The intelligent analysis in this embodiment may include:
(1) when the experimental pattern information of the to-be-tested sample matches the theoretical pattern information of the crystal structure database, the crystallographic information and relevant phase composition information about the to-be-tested sample can be obtained directly according the matched result therefrom;
(2) when the experimental pattern information of the to-be-tested sample mismatches the theoretical pattern information of the crystal structure database, 1) retrieving the theoretical pattern information having a same isomorphic structure as that of the experimental pattern information from the crystal structure database, refining the theoretical pattern information of the isomorphic structure so that the refined theoretical pattern information matches the experimental pattern information, and obtaining the crystallographic information and relevant phase composition information about the to-be-tested sample based on a matched result therefrom. In the present disclosure, refining the pattern information or the pattern may refer to adjusting various parameters corresponding to the original pattern, such as replacing known elements of the original pattern, to change the peak size, shape, position, etc. of the pattern curve.
2) when there is no retrieved theoretical pattern information of the isomorphic structure, constructing a structure model cooperatively on the to-be-tested sample by using positive space search, simulated annealing and genetic algorithms in combination of traditional crystallographic methods and machine learning methods, obtaining the theoretical pattern information of the to-be-tested sample by calculation based on the constructed structure model, refining the theoretical pattern information of the to-be-tested sample so that the experimental pattern information obtained by examination of the to-be-tested sample matches the refined theoretical pattern information of the to-be-tested sample, and obtaining the crystallographic information and relevant phase composition information about the to-be-tested sample based on a matched result therefrom.

The experimental pattern information and the theoretical pattern information may be at least one of time/space pattern information and energy pattern information. The time/space pattern information may be such as X-ray diffraction pattern, neutron diffraction pattern, and electron diffraction pattern. The energy pattern information may include emission spectrum, absorption spectrum, and scattered spectrum. The emission spectrum may be such as atomic emission spectrum and/or infrared emission spectrum; the absorption spectrum may be such as infrared absorption spectrum and/or ultraviolet absorption spectrum; and the scattered spectrum may be such as Raman spectrum.

The calculating procedures of the theoretical pattern information in the embodiment may include:
(1) calculating the time/space pattern information based on a powder diffraction intensity integral formula; and
(2) calculating the energy pattern information by simulating crystal structure based on a quantum chemical method, specifically, obtaining optical spectrum information about the emission spectrum, the absorption spectrum and the scattered spectrum by simulating atomic nucleus vibration of crystal structure based on the quantum chemical method, and obtaining energy spectrum information about the emission spectrum, the absorption spectrum and the scattered spectrum by simulating a corresponding electronic structure of crystal structure based on the quantum chemical method.

The material structure data in this embodiment obtained by experimental measurement in the crystal structure database may refer to the material structure data obtained by experimental characterization of samples with known structures; and the material structure data obtained by theoretical prediction may be the one which is calculated by at least one of the calculating procedures and then obtained after eliminating repeated structures in the structure database with a graph theory based scheme.

The calculating procedures of the material structure data obtained by theoretical prediction may include:

procedure 1): performing element substitution on the material structure data obtained by experimental characterization of samples with known structures before performing structure relaxation in combination with DFT to obtain a new material and the material structure data thereof;

procedure 2): performing structure search on the material structure data obtained by experimental characterization of samples with known structures based on PSO and/or genetic algorithm to obtain new material and the material structure data thereof; and procedure 3): performing feature extraction on the material structure data obtained by experimental characterization of samples with known structures, and obtaining a new material and the material structure data thereof by reverse design based on the extracted features.

In an improvement of this embodiment, pattern preprocessing may be performed on the experimental pattern information obtained by examination of the to-be-tested sample before compared with the theoretical pattern information of the crystal structure database, wherein the pattern pre-processing may comprise performing processes on the obtained experimental pattern information of the to-be-tested sample include eliminating noise, subtracting background and smoothing curves. Further, peak search may be performed before comparing with the theoretical pattern information of the crystal structure database, the peak search may comprise finding characteristic peak information of the experimental pattern information of the to-be-tested sample, and setting a peak intensity recognition threshold and a peak spacing recognition threshold according to the characteristic peak information about the experimental pattern of the to-be-tested sample during comparison to determine the comparison range, so as to improve the peak searching accuracy of the pattern.

For the material analysis method in this embodiment, one experimental pattern obtained from the test of the to-be-tested sample can be used for comparative analysis, or two or more experimental patterns can be used for comparative analysis, so as to obtain more accurate crystallographic information and relevant phase composition information about the to-be-tested sample.

Further, the material analysis method of the present embodiment may also include: quantitatively calculation of each content percentage of each phase of the to-be-tested sample according to phase composition information of the to-be-tested sample.

Taking the X-ray diffraction pattern (XRD diffraction pattern) as an example, according to the matching degree of the diffraction peak positions and peak intensities corresponding to the experimental pattern information about the X-ray diffraction pattern of the to-be-tested sample and the theoretical pattern information about the X-ray diffraction pattern calculated from the crystal structure database, the matching degree of corresponding structures between the experimental pattern of the to-be-tested sample and the theoretical pattern of the crystal structure database can be determined. Specifically, the matching degree of structures between the experimental and theoretical patterns is calculated through the quality factor matching formula. The larger the matching degree value, the higher the matching degree, and vice versa. When the matching degree value is higher than a certain value, such as greater than or equal to 0.01, it is considered that the structure in the corresponding crystal structure database belongs to a phase in the to-be-tested sample. When the matching degree value is lower than a certain value, such as less than 0.01, it is considered that the to-be-tested sample has not been matched in the crystal structure database, and a further isomorphic judgment is needed. If there is isomorphic matching, analysis is performed according to the isomorphic matching; and if there is no isomorphic matching, analysis is further performed in combination with traditional crystallographic methods, machine learning methods and existing structures in the crystal database.

Specifically, the material analysis method based on the X-ray diffraction pattern may include the following steps:

comparing the experimental pattern information about the X-ray diffraction pattern obtained by the examination of the to-be-tested sample with the theoretical pattern information about the X-ray diffraction pattern calculated from the structure data of each material in the crystal structure database, when they match, the crystallographic information and relevant phase composition information about the to-be-tested sample may be obtained directly according to the matched result therefrom; and when they mismatch, the following operations may be performed:

1) Diffraction Pattern Indexing

The indexing method for X-ray diffraction pattern of polycrystalline powders is to find solution(s) that meet the following equations within an experimental error range, calculate the lattice parameters, including a, b, c and alpha, beta and gamma, from the crystallographic plane spacing corresponding to the diffraction peaks, and determine the crystallographic plane indices of the diffraction peaks.

2) Space Group Determination

According to the systematic extinction caused by the presence of centered lattice, spiral axis and slip plane in the crystal, the lattice type and X-ray diffraction group of the crystal may be determined after indexing; and the space group may be determined based on the statistical law of diffraction intensity.

3) Construction of Structure Model

With the support of a large amount of structure data in the crystal structure database, searching for isomorphic structures may be performed first. Regarding a new compound crystal structure, since a large number of crystal structures have been studied and entered the database, checking whether it is isomorphic to a certain compound with a known structure first. After the chemical formula, lattice parameters and space group of the new compound are determined, substances with similar chemical formula, lattice parameters and space group can be searched in the structure database according to the number of atoms in the cell and the chemical properties of the elements, and the diffraction patterns of the two may be compared. A comparison method may be to search the isomorphic structure in the crystal structure database according to the peak intensities contained in the pattern information and the crystallographic plane index information of the corresponding peak intensities obtained through indexing. The crystal structure which is isomorphic to a corresponding substance of the experimental sample shall have a similar proportional relationship between different crystallographic plane indices and peak intensities. If a compound with a similar diffraction pattern and a known crystal structure can be found, that is, the theoretical pattern information of the isomorphic structure, the distribution and rough position of atoms in the new compound can be determined. Then they may be performed with Rietveld refinement such that the refined theoretical pattern information matches the experimental pattern information, and then the crystallographic information and relevant phase composition information about the to-be-tested sample can be obtained based on the matched result therefrom.

Regarding the to-be-tested sample that do not have isomorphic structures retrieved in the crystal structure database, combined with the traditional crystallographic methods and the machine learning methods, a structure model may be constructed cooperatively for the to-be-tested sample by using positive space search, simulated annealing and genetic algorithms, a new theoretical pattern information obtained by calculation based on the constructed structure model may be refined so that the refined theoretical pattern information matches the experimental pattern information obtained by examination of the to-be-tested sample, and then the crystallographic information and relevant phase composition information about the to-be-tested sample may be obtained based on the matched result therefrom.

In an embodiment of the present disclosure, the refinement of pattern information or pattern may be specifically Rietveld refinement, that is, Rietveld structure refinement, which may include using fitting methods such as least square method and adjusting various parameters to change the peak value, shape, position, etc. of the curve of the theoretical pattern of XRD diffraction pattern calculated based on the crystal structure database, so that the theoretical curve is consistent with the experimental pattern curve of the X-ray diffraction pattern of the to-be-tested sample, that is, matching, thereby obtaining the required experimental results, such as specific atomic position, bond length, bond angle information, more accurate lattice constant, and the like. The crystal structures obtained after refinement and without being included in the database may be stored in the crystal structure database to upgrade the crystal structure database.

The theoretical pattern information about the X-ray diffraction pattern of the material structure data may be calculated with integral intensity in this embodiment. Specifically, the materials diffraction pattern database may be obtained from the XRD diffraction intensity integral formula of the powder sample based on the known crystal structures, wherein the powder diffraction intensity integral formula is shown as the following Equation 1.

$$I_{(hkl)\alpha} = \left[\frac{I_0\lambda^3}{32\pi r}\frac{e^4}{m_e^2 c^4}\right] \times \left[\frac{M_{hkl}}{2V_\alpha^2}|F_{(hkl)\alpha}|^2\right. \qquad \text{Equation 1}$$

$$\left.\left(\frac{1+\cos^2 2\theta \cos^2 2\theta_m}{\sin^2\theta\cos\theta}\right)\exp\left(-2B(\sin\theta/\lambda)^2\right)\right] \times \left[\frac{W_\alpha}{\rho_\alpha\mu_m^*}\right]$$

where $I_0$ represents the intensity of an incident beam, $\lambda$ represents a wavelength, e represents the charge of an electron, $m_e$ represents the mass of the electron, r represents the distance from a scattered electron to the detector, c represents the speed of light, $M_{hkl}$ and $F_{hkl}$ respectively represents the multiplicity and structure factor of hkl reflection, $V_\alpha$ represents the cell volume of $\alpha$ phase, $\theta$ and $\theta_m$ respectively represents the diffraction angles of hkl reflection and monochromator, B represents an average atomic displacement parameter (ADP), $W_\alpha$ and $\rho_\alpha$ respectively represents the weight fraction and density of $\alpha$ phase, and $\mu^*_m$ represents the mass absorption coefficient of the whole sample.

Further, the content percentage of each phase in the to-be-tested sample may be quantitatively calculated; specifically, it may include performing quantitative calculation on the data of each diffraction peak in a to-be-measured phase; that is, the RIR value of each diffraction peak of the to-be-measured phase is calculated according to the diffraction intensity at the corresponding position in the corundum diffraction pattern, and the mass fraction of the to-be-measured phase is obtained by combining the intensity proportion of different diffraction peaks in the diffraction pattern of the whole to-be-measured phase. The details are as follows:

For phase x in X mixed phases, its mass fraction may be $$W_x = \frac{\sum_{m=1}^{M}\varphi_m\frac{I_m}{RIR_m}}{\sum_{x=1}^{X}\sum_{m=1}^{M}\varphi_m\frac{I_m}{RIR_m}}$$

wherein $$\varphi_m = \frac{I_m}{\sum_{m=1}^{M}I_m}$$

$$RIR_m = \frac{I_m}{I_m^{\alpha-Al_2O_3}}$$

where M represents the number of diffraction peaks of phase x, m represents the m-th diffraction peak arranged in descending order of intensity in the phase x diffraction pattern, $I_m$ represents the diffraction intensity of the m-th diffraction peak, $$I_m^{\alpha-Al_2O}$$

represents the m-th diffraction peak arranged in descending order of intensity in the standard corundum diffraction pattern.

Based on the above material analysis method, a material analysis system based on a crystal structure database may further be developed in this embodiment. The system may include a crystal structure database, a theoretical pattern information calculating unit, a data pre-processing unit, a comparing unit and a result outputting unit.

The crystal structure database may have material structure data obtained by experimental measurement and/or theoretical prediction, and the material structure data may contain chemical formula, space group, unit cell parameter, and specific coordinates of atoms in unit cell coordinate of atoms in unit cell. The theoretical pattern information calculating unit may be configured to calculate theoretical pattern information according to structure data of each material in the crystal structure database. The data pre-processing unit may be configured to obtain the experimental pattern information obtained by examination of the to-be-tested sample, and perform noise removal on the experimental pattern information. The comparing unit may be configured to compare the result of the data pre-processing unit with the theoretical pattern information calculated by the theoretical pattern information calculating unit. The result outputting unit may be configured to output the crystallographic information and relevant phase composition information about the to-be-tested sample through intelligent analysis based on the result of the comparing unit, wherein the crystallographic information may include at least one of space group, unit cell parameter, and specific coordinates of atoms in unit cell.

The material analysis system is actually used to perform each unit of the material analysis method based on the crystal structure database through each unit to achieve automatic material analysis. Therefore, the functions and roles of each unit of the material analysis system can refer to the material analysis method of this embodiment. For example, intelligent analysis, the retrieval mode for isomorphic structures, the iterative update of the crystal structure database, the type of pattern information, the calculating procedures of the theoretical pattern information, the quantitative calculation of content percentage of each phase in the to-be-tested sample, the method of obtaining the material structure data from the crystal structure database with experimental measurement, and the method of obtaining the material structure data from the crystal structure database with theoretical prediction, etc. can all refer to the material analysis method.

Therefore, the data pre-processing may also comprise performing processes on the obtained experimental pattern information of the to-be-tested sample include eliminating noise, subtracting background and smoothing curves. Further, the data pre-processing may also comprise finding characteristic peak information of the experimental pattern information of the to-be-tested sample, and setting a peak intensity recognition threshold and a peak spacing recognition threshold according to the characteristic peak information about the experimental pattern of the to-be-tested sample during comparison to determine the comparison range, so as to improve the peak searching accuracy of the pattern.

Further, the data pre-processing unit may further include identifying contents of files in different formats for the experimental pattern information of the to-be-tested sample, and read relevant information in the files for subsequent comparison according to a result of file identification.

Further, the material analysis system in this embodiment may further include a crystal structure database searching unit configured to extract and present the crystal structure database as a whole. This unit may provide a user with a way to directly access the database information. All data of the corresponding structure in the crystal structure database, including chemical formula, space group, unit cell parameters and specific coordinates of atoms in unit cell, can be found through any of ICSD number, chemical formula, and constituent elements. In the present disclosure, the unit cell parameters mainly include lattice vector and unit cell volume.

Further, the material analysis system in this embodiment may further include a pattern calculating unit. The pattern calculating unit may be configured to calculate a pattern of a given structure and perform broadening calculation on a pattern containing only peak positions and peak intensities. This unit can provide an intuitive visual effect of the peak shape, allowing users to more easily compare with their own experimental data. The broadening calculation may include broadening intensity values with Gaussian, Lorentz, Voigt and convolution, and accumulating an overlapping part of the four kinds of broadened. Different experimental diffraction conditions and sample conditions may produce different peak shapes. This step allows users to fine adjust the standard peak shapes according to their own experimental pattern to obtain a best contrast mode.

Further, the material analysis system in this embodiment may further include a single peak search unit. The single peak search unit may include select a peak with a mouse, or manually, or input a specific peak position, peak intensity and precision data to search and present the crystal structure database. In this step, users can search for a specific peak to obtain all the structure information of the peak in the database.

The material analysis system based on the materials diffraction pattern database in this embodiment may specifically be named Unnamed Material Analysis System, and the development language adopted is Python. In this system: the login interface can only be logged in after the user name and password are matched; a main interface is built with PyQt5, with logic and interface being separated and corresponding connection being established; an import module may employ a scheme of identifying file name+related suffix strings, read text content with regular expressions to filter specific information, such as the peak positions and peak intensities contained in various support files; a scan velocity function is actually a point selection method, where 2/3/4 times a scanning velocity is to select one data point for every 2/3/4 of the peak positions and peak intensities to achieve a change in the scanning rate of the pattern; a background identification function is to compare each data point in the pattern with adjacent data points to select a relatively smaller one, connect the starting point with the ending point, and perform data fitting with reference to the smaller point to make a baseline map; a $K\alpha2$ deduction function similar to the background recognition, in which each diffraction peak is determined by two characteristic peaks, $K\alpha1$ and $K\alpha2$, a weaker term of each diffraction peak is found and turned to zero or returned to the vicinity of the baseline; smoothing actually involves using a linear function, a quadratic function, or a cubic function to smooth and fit curves, where the number of execution of fitting refers to the number of times a function is used to process data; a database interface function accesses, modifies and extracts the database with sqlite; and search report is an integration of the above functions and processing results.

For example, pseudo codes and formulas to implement the retrieval process are as follows:

```
procedure comparator(exp_angle, cal_angle, delta):
begin
    normalize exp_intensity
    initialize Flag ← 0, num_match← 0)
    initialize matched_EP←Ø, matched_CP←Ø,
    for EP in exp_angle do
        for idx, CP in cal_intensity do
            if |EP – CP| < delta then
            next_CP←cal_angle[idx+1]
                if next_CP> CP and next_CP< EP then
                    continue
                end if
                if CP in matched_CP then
                    continue
                end if
            matched_CP append CP
            matched_EP append EP
            num_match←num_match + 1
            flag ←idx
                break
            end if
        end for
    end for
    if num_match> 5 then return FOM(matched_CP, matched_EP)
    else return 0
end
        FOM = NR(wθFOMθ + (1 – wθ)FOMI)
```

-continued

N = number of matched_CP $$R = \sum_i^{N_{exp}} I_i^{exp}$$

$$FOM_\theta = 1 - \frac{\sum_i^{N_{exp}} \left| 2\theta_i^{exp} - 2\theta_i^{db} \right|}{N_{exp} \cdot \text{delta}}$$

$$FOM_i = 1 - \frac{\sum_i^{N_{exp}} \left| I_i^{exp} - I_i^{db} \right|}{N_{exp} \cdot 100}$$

The formula to calculate the diffraction pattern is as follows:
Lorentz peak shape function:

$$I(2\theta) = \frac{1}{\pi} \frac{w_2}{w^2 + (2\theta - 2\theta_0)}, \, w = H/2$$

Gaussian peak shape function:
$I(2\theta) = I_{max} \exp \left[ -\pi \, (2\theta - 2\theta_0)^2 / b^2 \right]$, $\beta = 0.5 \, \Gamma \, (\pi/\log_e 2)^{1/2} \, \Gamma_G = 2.3556$
Pearson peak shape function:

$$I(2\theta) = I_{max} \frac{w^{2m}}{\left[ w^2 + (2^{1/m-1})(^2\theta - 2\theta_0)^2 \right]^m}$$

The material analysis system in this embodiment is a new scientific system based on database and analysis software. On the one hand, a new paradigm for structural chemistry and material gene research based on graph theory has been developed, in which a nearest neighbor atom bonded to a central atom is defined as a structural unit, then the atom or structural unit is abstracted into a point in graph theory, achieving, in combination with computer intelligent computing, a technical breakthrough in correctly determining structural isomorphism and quantitatively describing the degree of isomerization and evolution between structures. With the expression methods of crystal structure and material gene based on graph theory, the space atomic/molecular structure can be geometrically topologized, greatly improving the efficiency and accuracy of intelligent material identification, and constructing a high-quality crystal structure database with over 600,000 structures (SCIENCE CHINA Chemistry (2019) 62, 982). On the other hand, the Unnamed Material Analysis System utilizes microscopic elements such as structural elements and their connections and chemical bond interactions, in combination with computer high-throughput intelligent comparison analysis, to achieve intelligent detection and analysis of materials.

In the function realization of the material analysis system in this embodiment, the deconstruction, query and extraction of the crystallographic database can refer to the existing software such as jade and qualx.

Compared with the existing software such as jade and qualx which requires high costs to use and generally has some shortcomings such as complicated retrieval procedures, stiff functions, and unattractive interfaces, the material analysis system of this embodiment has the following characteristics:

1. all developed by School of Advanced Materials, Peking University;
2. fully opened for free to the public;
3. simple retrieval program, easy to use, and beautiful, neat and generous interface; and
4. rapid retrieval and user-friendly functions.

The material analysis system of this embodiment comprehensively considers various factors such as the current research and development situation at home and abroad, the positioning and strength of schools and colleges, and the needs of researchers. It is a structure analysis system that is very suitable for the structure analysis system used by scientific researchers.

Specific application demonstration:

I. Example of Phase Retrieval for α-MnO$_2$

This example uses a suspected α-MnO$_2$XRD examination result obtained by experiment synthesis under the example directory in the client program installation package for phase retrieval.

Figure 2:
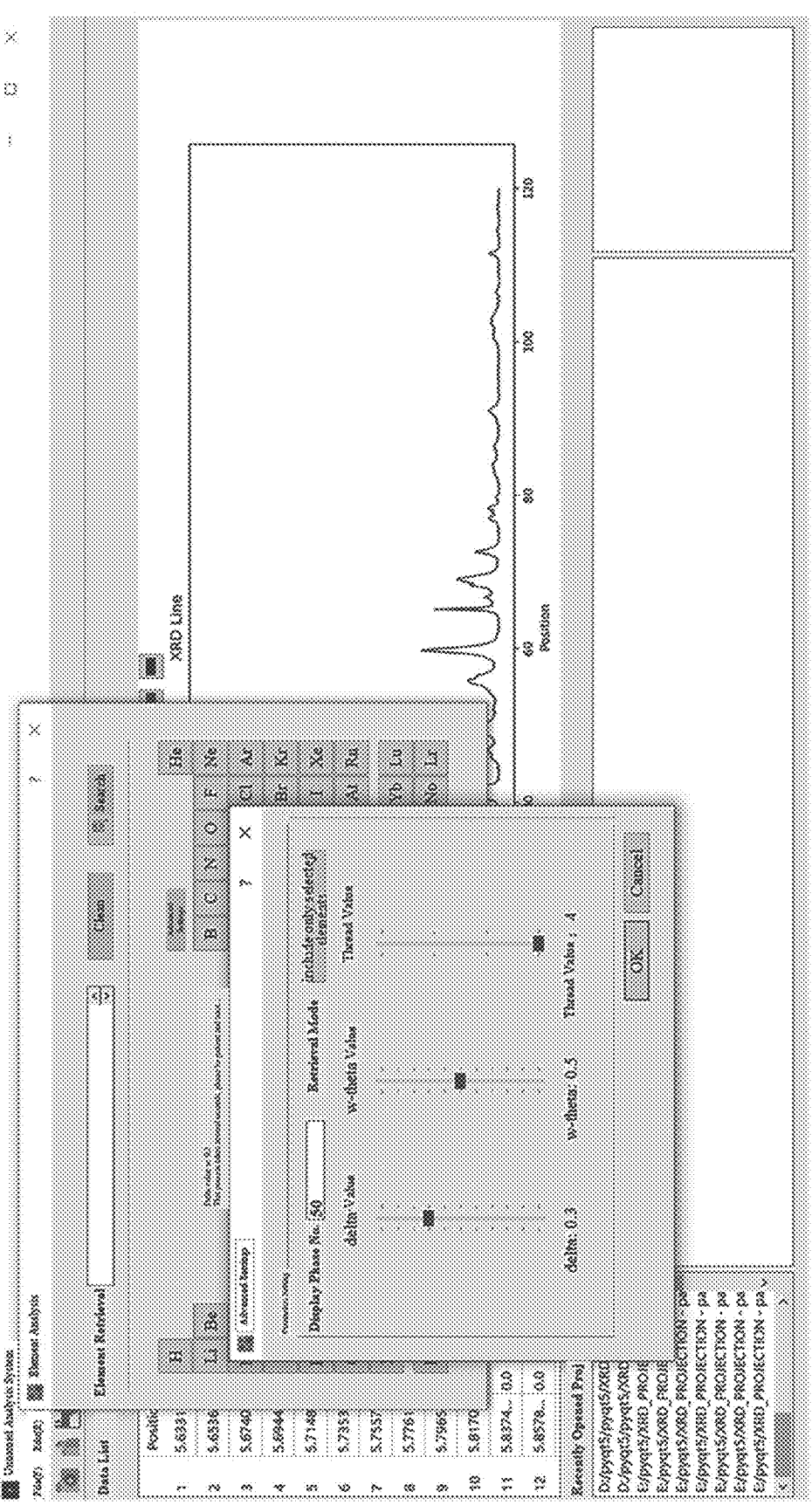
FIG. 2 is a schematic diagram of an element retrieval interface in accordance with an embodiment of the present disclosure.
Figure 3:
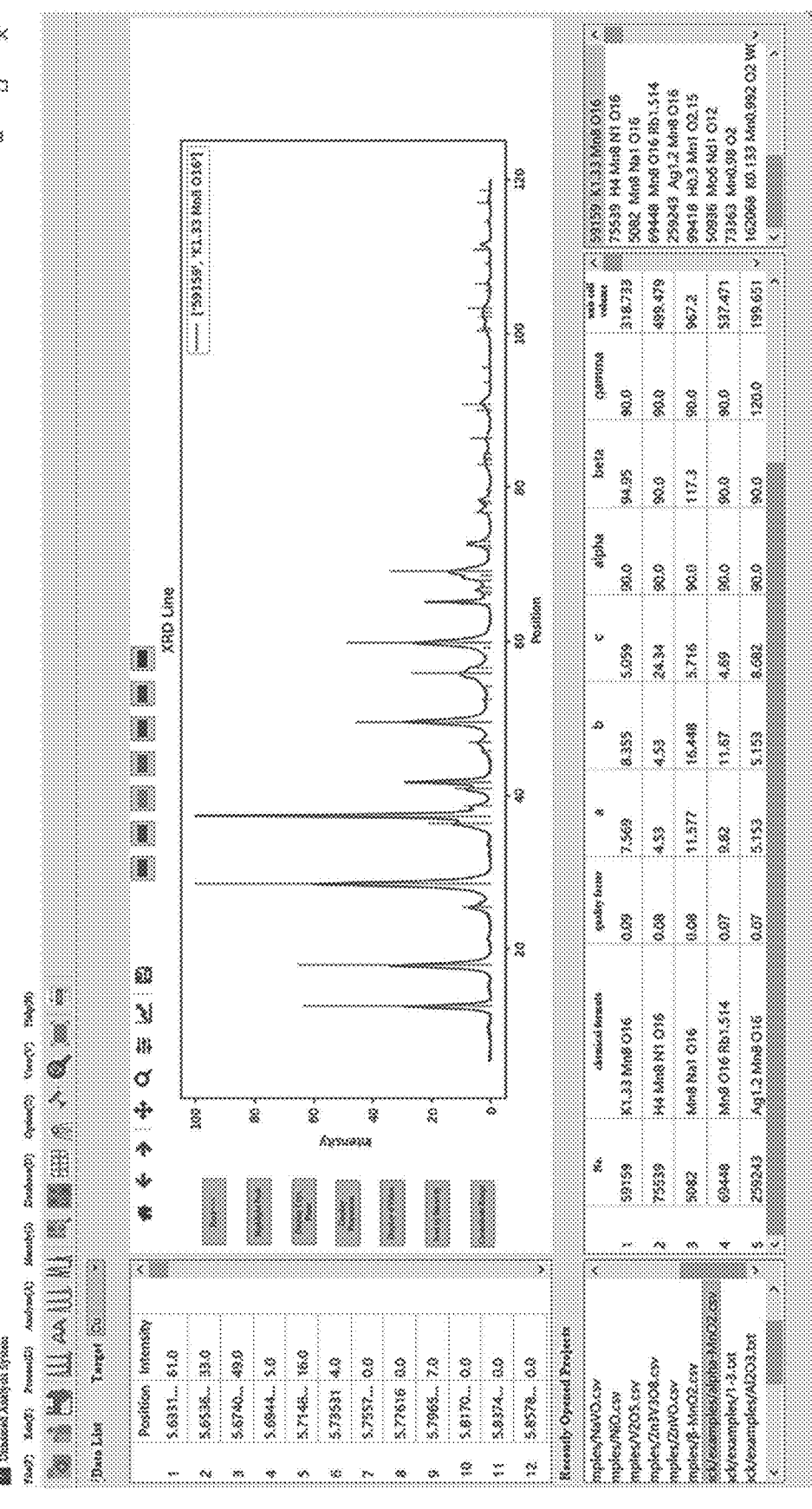
FIG. 3 is a schematic diagram showing an interface presentation after the retrieval is completed in accordance with an embodiment of the present disclosure.
Figure 4:
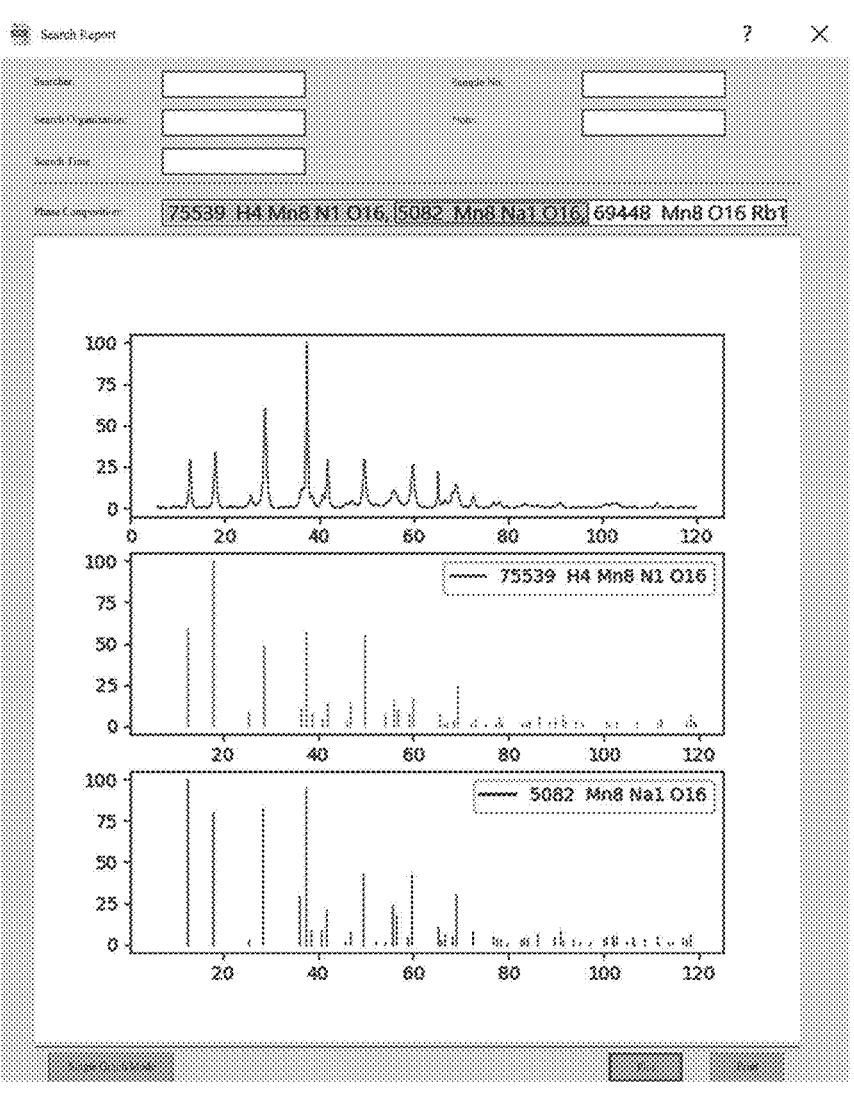
FIG. 4 is a schematic report diagram in accordance with an embodiment of the present disclosure.

As shown in FIG. 1, the main interface is entered after open α-MnO$_2$·csv. The element retrieval interface as shown in FIG. 2 is displayed after background deduction, Kα2 deduction, and curve smoothing. The pre-processing such as background deduction, Kα2 deduction and curve smoothing can be selected as required. In the "Element Analysis" dialog box, an element may be inputted by clicking the periodic table of elements, or it may be directly inputted by manually to retrieve. A default Delta value may be 0.3, or a dialog box may be presented by clicking Advanced Settings, which shows: 1. Number of phases: a user can select the number of phases he/she want to see; 2. delta: it may effect matching accuracy; 3. w-theta: it may mean the weight of theta's impact on quality factors; 4. Thread value: it may use multiple threads to process data, the higher the thread, the more CPU resources it occupies, and the faster the retrieval is; 5. Retrieval mode: it may refer to selectively searching for the selected elements in three modes: only include/ include all/include any, where the search range of these three modes becomes wider in turn, the accuracy of search results increases in turn, and the search speed becomes slower in turn. These values may have been preset with default recommended values in the software, which can be modified as needed during use. The default value is used and the retrieval range of "Include Any" is selected in this example. After setting the parameters, two elements, "Mn" and "O", may be inputted by directly clicking the periodic table of elements, the search icon may be clicked to enter a progress bar reading mode. A result may be displayed as shown in FIG. 3 after reading quickly. The lower part of FIG. 3 shows the phase information in the matched database, which is sorted in descending order according to the quality factor (FOM, fitness), indicating a decrease in matching degree. The phase icon may be clicked to display a comparison diagram in a region of the pattern for intuitive comparison. In addition, during the progress bar reading and retrieval, other functions of the software can be used without interfering with each other (dual-thread). The results show that K$_{1.33}$Mn$_8$O$_{16}$ is the most consistent phase. A "Export Report" icon may be clicked to get the results, as shown in FIG. 4. The "Export Report" module may contain information such as the searcher, search organization, search time, search sample number, and note in the header, which can be filled in by users or search organization. At the bottom of FIG. 4, all the phases and their ICSD numbers of the detection results are listed. A component icon may be clicked to draw a comparison between the sample diffraction pattern and the standard pattern of the detection results in the main area. Multiple images may be selected by pressing and holding "ctrl". At most three standard images can be selected for comparison with the original image. The drawing mode may be divided into "Single graph mode" referring to putting all the patterns in a coordinate system and "Multi graph mode" referring to each pattern having its own coordinate axis. Users can switch freely according to their preferences and results presentation.

II. Display of "Recently Opened Projects"

Figure 5:
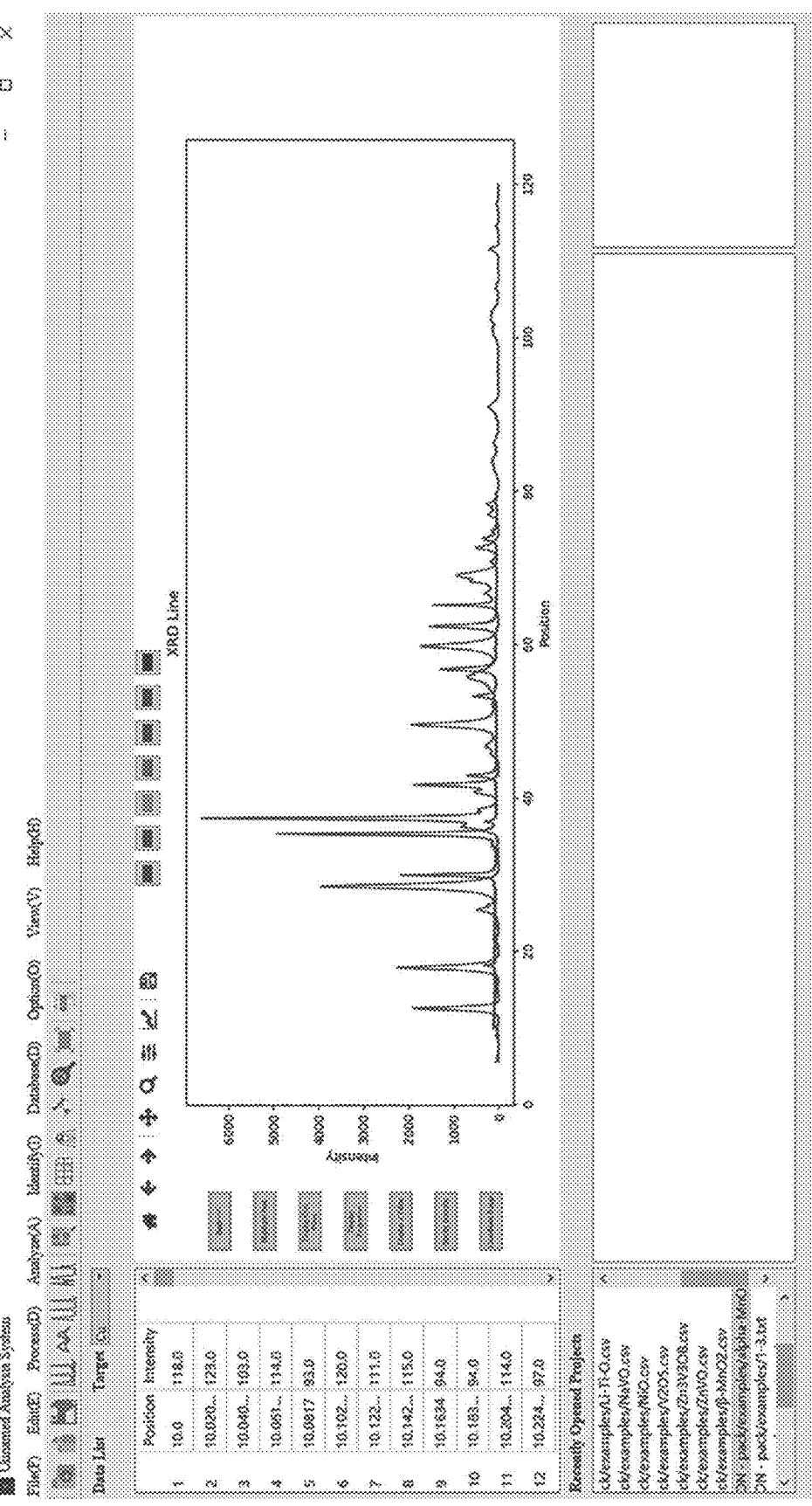
FIG. 5 is a schematic diagram showing comparison of a project opened recently in accordance with an embodiment of the present disclosure.

As shown in FIG. 5, the software may record in the "Recently Opened Projects" at the bottom left corner every time the user opens a new project. The next time the user access the new project, he/she can directly click to open it. When there are projects in the current interface, the user may be asked whether to open a new interface or compare it with the existing projects, which is convenient for the user to observe directly. In addition, the data after each import or processing can be displayed in the table in the "Data List" on the left side, so that users can directly see the processed peak position and peak intensity data.

III. Display of Database Access System

Figure 6:
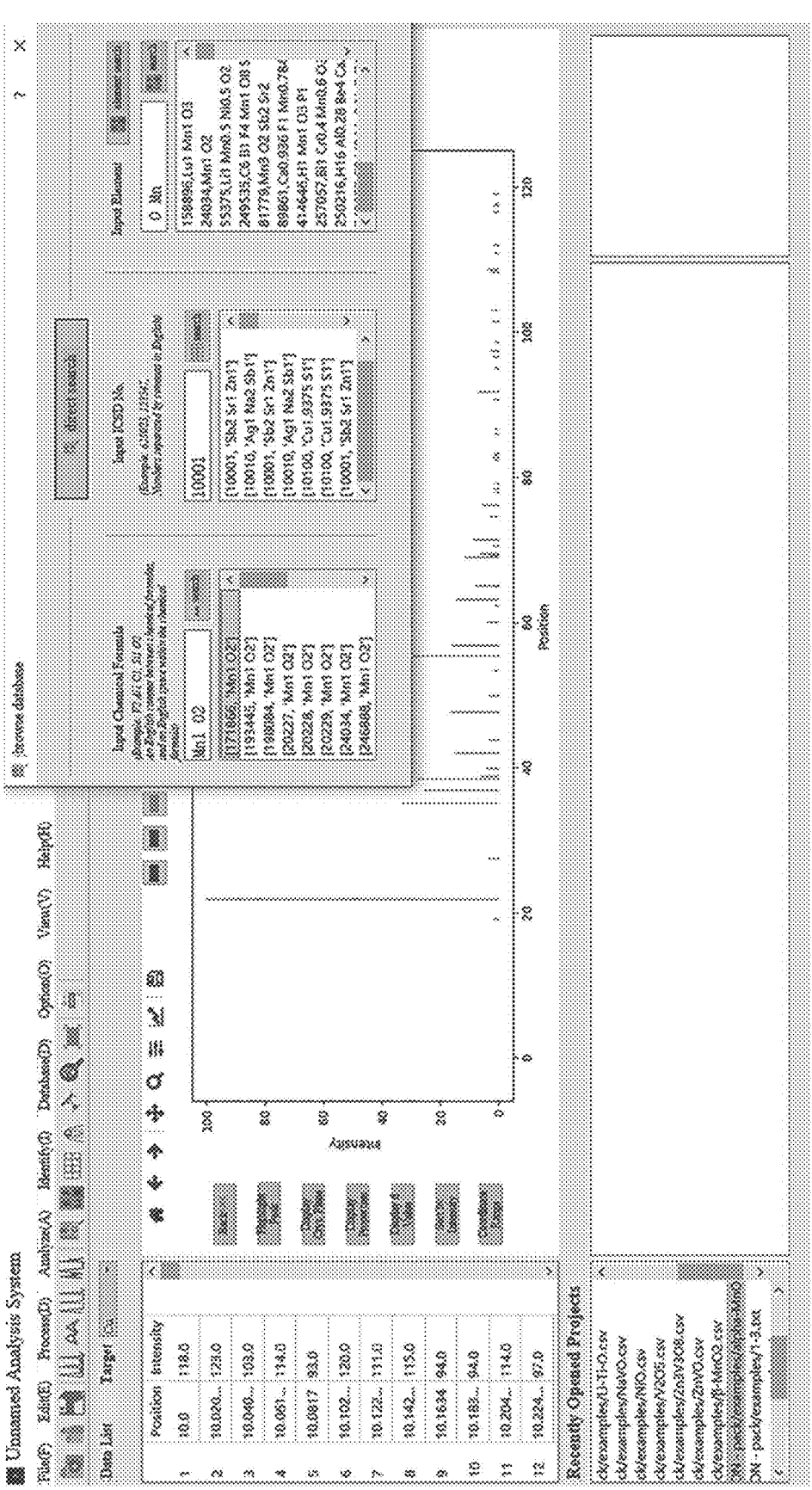
FIG. 6 is a schematic diagram showing a database search mode in accordance with an embodiment of the present disclosure.
Figure 7:
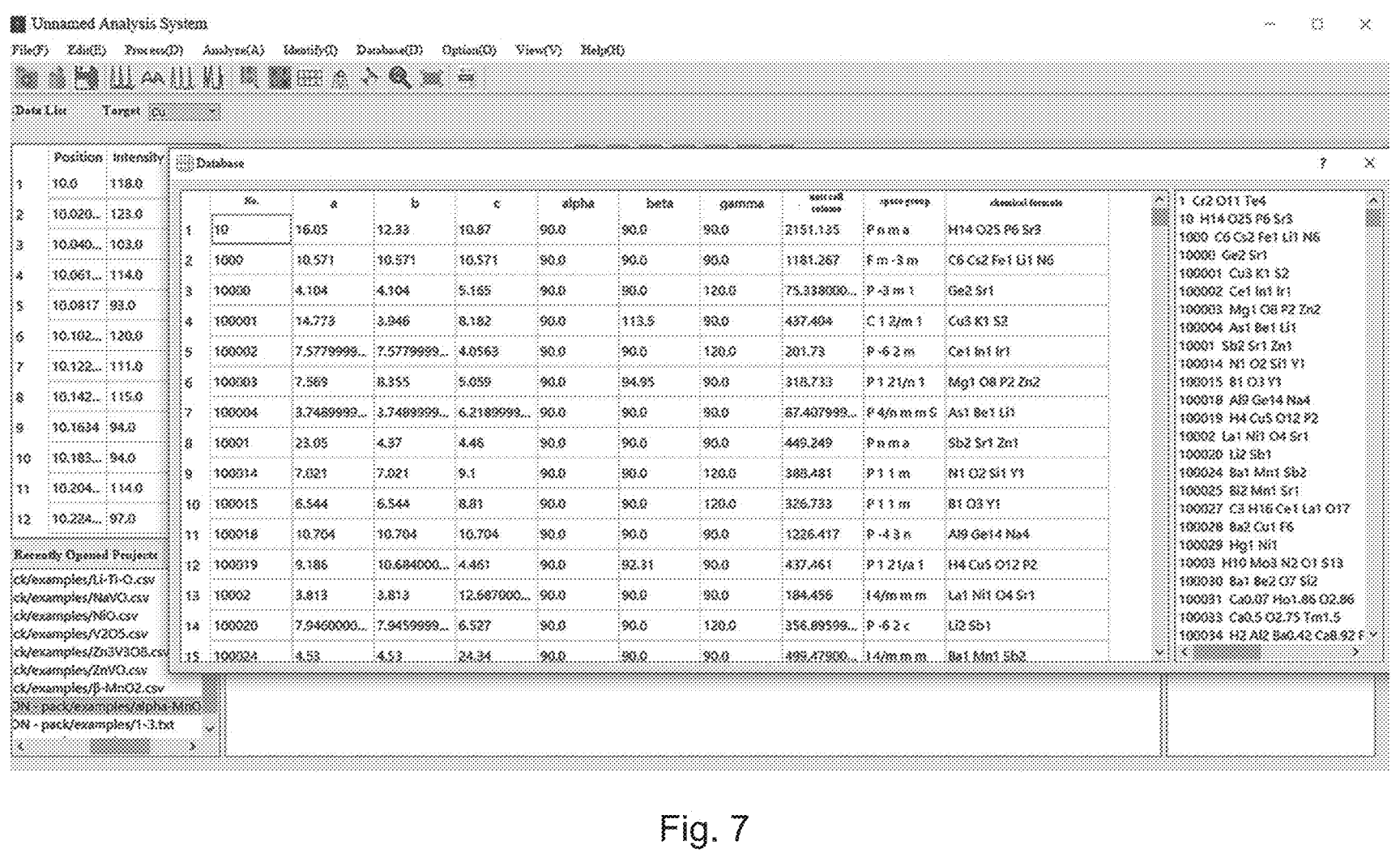

After opening the software, "Database (D)" on the menu bar may be clicked or the data icon on the toolbar may be clicked to enter the database access system. Taking $MnO_2$ as an example to demonstrate in three modes: input chemical formula, input ICSD number, and input element retrieval, as shown in FIG. 6. The search icon may be clicked to show the result, e.g. standard pattern in the database, on the main interface. If the direct retrieval icon is selected, all information in the database may be displayed on the interface at the rate of 100 entries per second, as shown in FIG. 7.

IV. Display of Diffraction Pattern Calculating Unit

Figure 8:
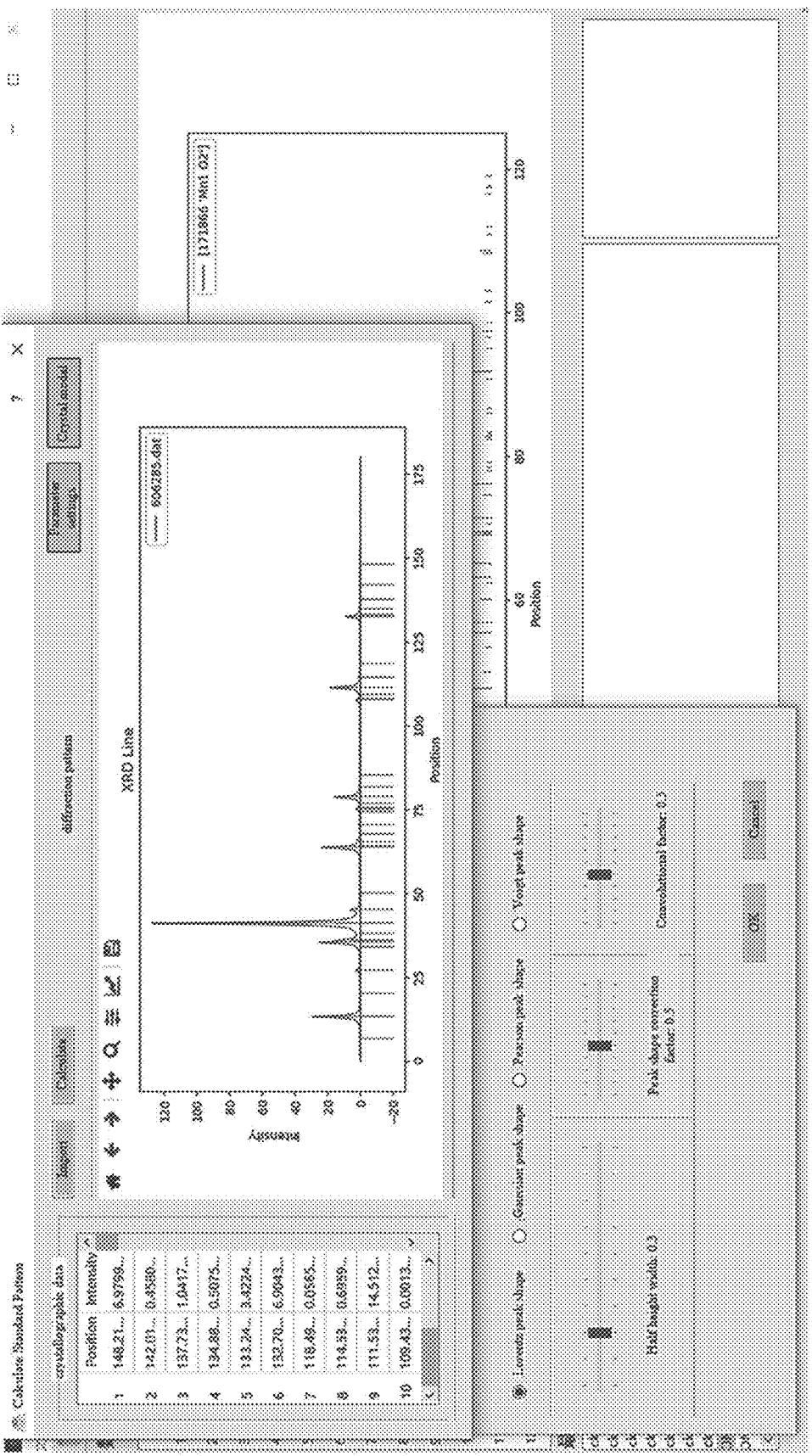
FIG. 8 is a schematic module diagram for calculating diffraction pattern in accordance with an embodiment of the present disclosure.

After opening the software, "Options (O)—Calculate Diffraction Pattern" on the menu bar or the data icon on the toolbar may be clicked to enter the diffraction pattern calculation mode. The "Import" icon in the dialog box may be clicked to save the data to be calculated into the system. Currently, files in formats such as txt/csv/cif/dat are supported. The information about peak position and peak intensity may be displayed in the "crystallographic data" column on the left. Then the "Calculate" icon may be clicked to broaden with a default Lorentz peak shape, and the default value of half height width is 0.3, as shown in FIG. 8. Diffraction peaks with different shapes can be obtained by adjusting different peak shapes such as Lorentz, Gaussian, Pearson, Voigt and different parameters such as half width, peak shape correction factor and convolution factor. The core algorithm is the four peak shape formula.

V. Display of Single Peak Search Unit

Figure 9:
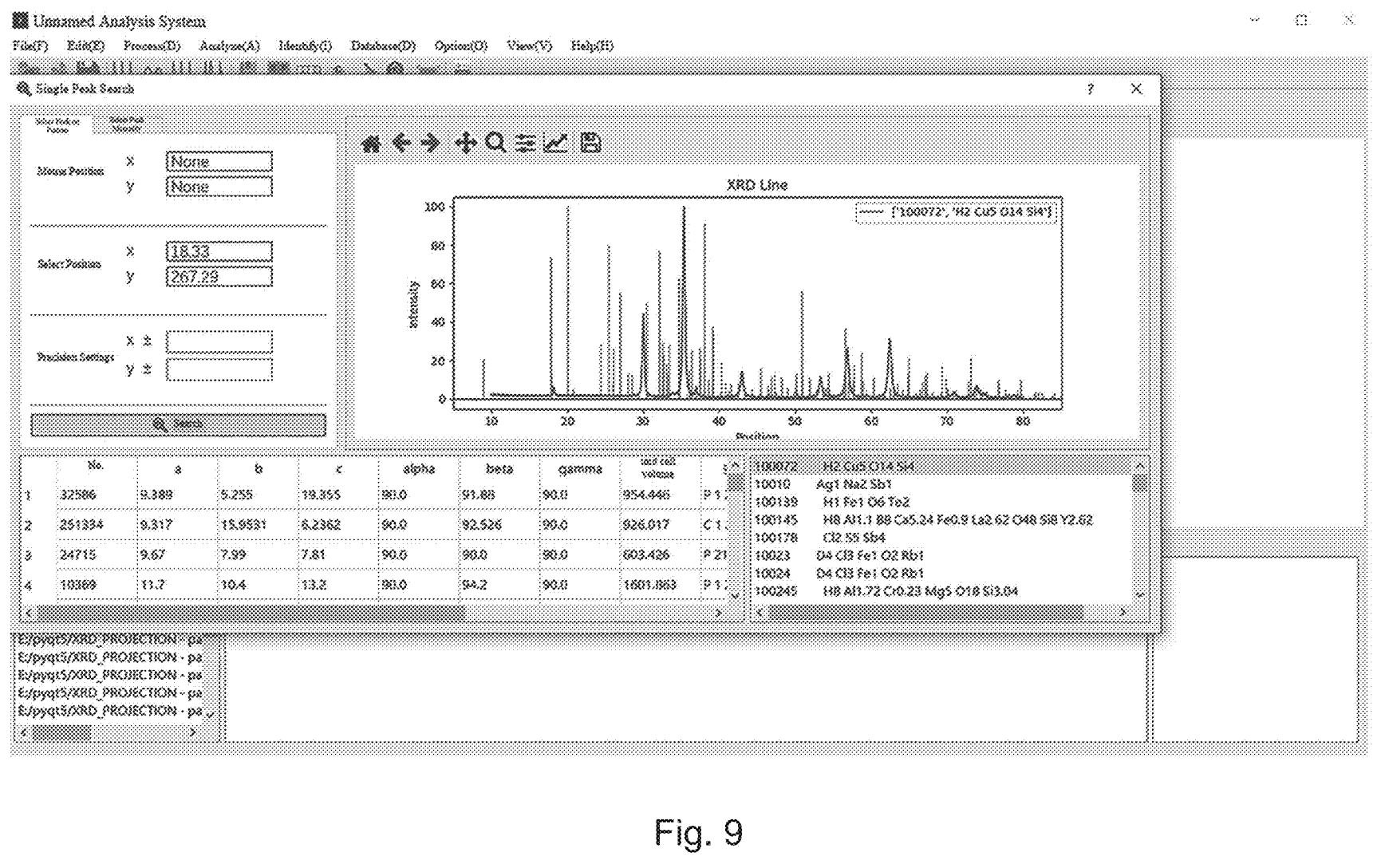

Taking the suspected $Zn_3V_3O_8$ sample imported into the software as an example, if there is a certain peak, usually a small peak, which cannot be found in the standard phase after detection, the single peak search function can be used to retrieve all phases containing this peak in the database to identify the possible second phase in the sample. "Identification (I)—Single peak search" in the menu bar or the data icon in the toolbar may be clicked to enter the single peak search mode, as shown in FIG. 9. It mainly includes two modes: select peak on pattern and select peak manually. In the "select peak on pattern" dialog, when the mouse moves on the imported pattern, the left side may display the coordinates of the mouse position. When the mouse is moved to the peak to be selected and then is clicked, the information about peak position and peak intensity may be inputted into the system, and then the accuracy can be set. For example, the deviation of ±1° in position and the deviation of ±200 units in intensity (default value). For example, when selecting 18.33° and intensity value of 267.29, the actual retrieval range is 17.33-19.33° and intensity value of 257.29-277.29. Manual peak searching means manual input of peak position and peak intensity.

The above content is a further detailed description of the present disclosure in combination with the specific embodiments. It cannot be determined that the specific embodiments are limited to these descriptions. For those skilled in the art, a number of simple deductions or substitutions can be made without departing from the concept of the present disclosure.

The invention claimed is:

1. A material analysis method based on a crystal structure database, comprising: comparing experimental pattern information obtained by examination of a to-be-tested sample with theoretical pattern information obtained by calculation of structure data of various materials from a crystal structure database, and obtaining crystallographic information and relevant phase composition information about the to-be-tested sample by intelligent analysis;

the crystallographic information including at least one of: space group, unit cell parameter, and specific coordinates of atoms in a unit cell; and the crystal structure database having material structure data obtained by experimental measurement and/or theoretical prediction, the material structure data containing chemical formula, space group, unit cell parameter, and specific coordinates of atoms in unit cell, wherein the intelligent analysis comprises:

when the experimental pattern information matches the theoretical pattern information, obtaining the crystallographic information and relevant phase composition information about the to-be-tested sample directly based on a matched result therefrom; and when the experimental pattern information mismatches the theoretical pattern information, retrieving the theoretical pattern information having a same isomorphic structure as that of the experimental pattern information from the crystal structure database, refining the theoretical pattern information of the isomorphic structure so that the refined theoretical pattern information matches the experimental pattern information, and obtaining the crystallographic information and relevant phase composition information about the to-be-tested sample based on a matched result therefrom; and when there is no retrieved theoretical pattern information of the isomorphic structure, constructing a structure model cooperatively on the to-be-tested sample by using positive space search, simulated annealing and genetic algorithms in combination of crystallographic methods and machine learning methods, obtaining the theoretical pattern information of the to-be-tested sample by calculation based on the constructed structure model, refining the theoretical pattern information of the to-be-tested sample so that the experimental pattern information obtained by examination of the to-be-tested sample matches the refined theoretical pattern information of the to-be-tested sample, and obtaining the crystallographic information and relevant phase composition information about the to-be-tested sample based on a matched result therefrom;

wherein, a retrieval mode about the theoretical pattern information of the isomorphic structure comprises: retrieving theoretical pattern information of the isomorphic structure from the crystal structure database according to a peak intensity proportional relation contained in the experimental pattern information; and/or the intelligent analysis further comprises: when the experimental pattern information mismatches the theoretical pattern information, adding the crystallographic information and relevant phase composition information about the to-be-tested sample into the crystal structure database to realize iterative update of the crystal structure database.

2. The material analysis method according to claim 1, wherein both the experimental pattern information and the theoretical pattern information comprises at least one of: time/space pattern information, and energy pattern information;

the time/space pattern information comprises at least one of X-ray diffraction pattern, neutron diffraction pattern and electron diffraction pattern;

the energy pattern information comprises at least one of an emission spectrum, an absorption spectrum and a scattered spectrum.

3. The material analysis method according to claim 1, wherein the material structure data obtained by experimental measurement in the crystal structure database refers to the material structure data obtained by experimental characterization of samples with known structures; and the material structure data obtained by theoretical prediction is the one which is calculated by at least one of the calculating procedures and then obtained after eliminating repeated structures in the structure database with a graph theory based scheme;

wherein the calculating procedures comprises:

1) Performing element substitution on the material structure data obtained by experimental characterization of samples with known structures before performing structure relaxation in combination with density functional theory (DFT) to obtain a new material and the material structure data thereof;

2) performing structure search on the material structure data obtained by experimental characterization of samples with known structures based on particle swarm optimization (PSO) and/or genetic algorithm to obtain new material and the material structure data thereof; and 3) performing feature extraction on the material structure data obtained by experimental characterization of samples with known structures, and obtaining a new material and the material structure data thereof by reverse design based on the extracted features.

4. A material analysis system based on a crystal structure database, comprising: a memory and a processor;

the memory being configured to store a program; and the processor being configured to implement the material analysis method according to claim 1 by executing the program stored in the memory.

5. The material analysis method according to claim 2, further comprising: cooperatively comparing at least two kinds of the experimental pattern information of the to-be-tested sample, and obtaining the crystallographic information and relevant phase composition information about the to-be-tested sample through the intelligent analysis.

6. The material analysis method according to claim 2, wherein the scattered spectrum is Raman spectrum.

7. The material analysis method according to claim 2, wherein calculating procedures of the theoretical pattern information includes:

(1) calculating the time/space pattern information based on a powder diffraction intensity integral formula; and (2) calculating the energy pattern information by simulating crystal structure based on a quantum chemical method, specifically, obtaining optical spectrum information about the emission spectrum, the absorption spectrum and the scattered spectrum by simulating atomic nucleus vibration of crystal structure based on the quantum chemical method, and obtaining energy spectrum information about the emission spectrum, the absorption spectrum and the scattered spectrum by simulating a corresponding electronic structure of crystal structure based on the quantum chemical method.

8. The material analysis method according to claim 5, wherein the intelligent analysis further comprises: quantitative calculation of each content percentage of each phase of the to-be-tested sample according to phase composition information of the to-be-tested sample.

9. The material analysis method according to claim 5, further comprises: performing pattern pre-processing on the experimental pattern information obtained by examination of the to-be-tested sample before comparing with the theoretical pattern information of the crystal structure database, the pattern pre-processing comprising performing processes on the experimental pattern information including eliminating noise, subtracting background and smoothing curves.

10. The material analysis method according to claim 5, further comprises: performing peak search before comparing with the theoretical pattern information of the crystal structure database, the peak search comprising finding characteristic peak information of the experimental pattern information obtained by examination of the to-be-tested sample; and setting a peak intensity recognition threshold and a peak spacing recognition threshold according to the characteristic peak information during comparison.

11. A material analysis method based on a crystal structure database, comprising:

calculating theoretical pattern information according to structure data of each material in the crystal structure database, the crystal structure database having material structure data obtained by experimental measurement and/or theoretical prediction, the material structure data containing chemical formula, space group, unit cell parameter, and specific coordinates of atoms in unit cell coordinate of atoms in unit cell;

obtaining experimental pattern information obtained by examination of a to-be-tested sample and perform noise removal on the experimental pattern information;

comparing the pre-processed experimental pattern information with the calculated theoretical pattern information; and outputting crystallographic information and relevant phase composition information about the to-be-tested sample by intelligent analysis according to a result of the comparison, the crystallographic information comprising at least one of space group, unit cell parameter, and specific coordinates of atoms in a unit cell, wherein the intelligent analysis comprises:

when the experimental pattern information matches the theoretical pattern information, obtaining the crystallographic information and relevant phase composition information about the to-be-tested sample directly based on a matched result therefrom; and when the experimental pattern information mismatches the theoretical pattern information, retrieving the theoretical pattern information having a same isomorphic structure as that of the experimental pattern information from the crystal structure database, refining the theoretical pattern information of the isomorphic structure so that the refined theoretical pattern information matches the experimental pattern information, and obtaining the crystallographic information and relevant phase composition information about the to-be-tested sample based on a matched result therefrom; and when there is no retrieved theoretical pattern information of the isomorphic structure, constructing a structure model cooperatively on the to-be-tested sample by using positive space search, simulated annealing and genetic algorithms in combination of crystallographic methods and machine learning methods, obtaining the theoretical pattern information of the to-be-tested sample by calculation based on the constructed structure model, refining the theoretical pattern information of the to-be-tested sample so that the experimental pattern information obtained by examination of the to-be-tested sample matches the refined theoretical pattern information of the to-be-tested sample, and obtaining the crystallographic information and relevant phase composition information about the to-be-tested sample based on a matched result therefrom;

wherein, a retrieval mode about the theoretical pattern information of the isomorphic structure comprises: retrieving theoretical pattern information of the isomorphic structure from the crystal structure database according to a peak intensity proportional relation contained in the experimental pattern information; and/ or the intelligent analysis further comprises: when the experimental pattern information mismatches the theoretical pattern information, adding the crystallographic information and relevant phase composition information about the to-be-tested sample into the crystal structure database to realize iterative update of the crystal structure database.

12. The material analysis method according to claim 11, further comprising: performing peak search comprising finding characteristic peak information of the experimental pattern information obtained by examination of the to-be-tested sample, so that a peak intensity recognition threshold and a peak spacing recognition threshold are set according to the characteristic peak information.

13. The material analysis method according to claim 12, further comprising: identifying contents of files in different formats for the experimental pattern information of the to-be-tested sample, and reading relevant information in the files for subsequent comparison according to a result of file identification.

14. The material analysis method according to claim 12, further comprising: extracting and presenting the crystal structure database as a whole.

15. The material analysis method according to claim 12, further comprising: calculating a pattern of a given structure and performing broadening calculation on a pattern containing only peak positions and peak intensities.

16. The material analysis method according to claim 12, further comprising: selecting a peak with a mouse, or manually inputting a specific peak position, peak intensity and precision data to search and present the crystal structure database.

* * * * *